(12) United States Patent
Einhaus et al.

(10) Patent No.: US 10,020,973 B2
(45) Date of Patent: Jul. 10, 2018

(54) INTERFERENCE PARAMETER SIGNALING FOR EFFICIENT INTERFERENCE CANCELLATION AND SUPPRESSION

(71) Applicant: Panasonic Intellectual Property Corporation of America, Torrance, CA (US)

(72) Inventors: Michael Einhaus, Darmstadt (DE); Alexander Golitschek Edler von Elbwart, Darmstadt (DE); Li Wang, Beijing (CN)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 15/122,384

(22) PCT Filed: Mar. 31, 2014

(86) PCT No.: PCT/CN2014/074355
§ 371 (c)(1),
(2) Date: Aug. 29, 2016

(87) PCT Pub. No.: WO2015/149213
PCT Pub. Date: Oct. 8, 2015

(65) Prior Publication Data
US 2017/0078126 A1    Mar. 16, 2017

(51) Int. Cl.
*H04Q 7/00*    (2006.01)
*H04L 27/26*   (2006.01)
(Continued)

(52) U.S. Cl.
CPC ...... *H04L 27/2613* (2013.01); *H04J 11/0056* (2013.01); *H04L 1/0003* (2013.01);
(Continued)

(58) Field of Classification Search
CPC . H04L 27/2613; H04L 1/0009; H04L 1/0003; H04L 1/0038; H04L 5/0053;
(Continued)

(56) References Cited

U.S. PATENT DOCUMENTS

| 2012/0106465 A1* | 5/2012 | Haghighat | ........ H04W 72/1289 370/329 |
| 2014/0126404 A1* | 5/2014 | Kim | ......................... H04L 1/00 370/252 |

(Continued)

FOREIGN PATENT DOCUMENTS

| CN | 101605356 A | 12/2009 |
| CN | 103037513 A | 4/2013 |

(Continued)

OTHER PUBLICATIONS

U.S. Appl. No. 61/948,873, filed Mar. 6, 2014.*
(Continued)

*Primary Examiner* — Chuong T Ho
(74) *Attorney, Agent, or Firm* — Seed IP Law Group LLP

(57) ABSTRACT

The present invention relates to transmission and reception of downlink control information in a communication system. In particular, a serving base station transmits to a terminal a downlink control information which includes a first field with a scheduling information and a second field with interference parameters (interference information). The receiver employs the interference parameters for interference estimation used in interference cancellation or suppression.

17 Claims, 13 Drawing Sheets

(51) Int. Cl.
  *H04J 11/00* (2006.01)
  *H04L 5/00* (2006.01)
  *H04L 1/00* (2006.01)
  *H04W 72/04* (2009.01)
  *H04W 72/08* (2009.01)
  *H04W 72/12* (2009.01)

(52) U.S. Cl.
  CPC .......... *H04L 1/0009* (2013.01); *H04L 1/0038* (2013.01); *H04L 5/0053* (2013.01); *H04W 72/042* (2013.01); *H04W 72/082* (2013.01); *H04W 72/1289* (2013.01)

(58) Field of Classification Search
  CPC ........... H04W 72/1289; H04W 72/082; H04W 72/042; H04J 11/0056
  USPC ................................................ 370/329, 330
  See application file for complete search history.

(56) References Cited

U.S. PATENT DOCUMENTS

| | | | | |
|---|---|---|---|---|
| 2014/0146765 | A1* | 5/2014 | Ji | H04W 72/082 370/329 |
| 2015/0181464 | A1* | 6/2015 | Lee | H04L 1/0026 370/329 |
| 2015/0256292 | A1* | 9/2015 | Song | H04L 1/0048 375/350 |

FOREIGN PATENT DOCUMENTS

| | | |
|---|---|---|
| EP | 3 096 556 A1 | 11/2016 |
| WO | 2013/068834 A1 | 5/2013 |
| WO | 2014/007699 A1 | 1/2014 |

OTHER PUBLICATIONS

U.S. Appl. No. 61/918,652, flied Dec. 19, 2013.*
3GPP TR 36.866 V12.0.0, "3$^{rd}$ Generation Partnership Project; Technical Specification Group Radio Access Network; Study on Network Assisted Interference Cancellation and Suppression (NAIC) for LTE (Release 12)," Mar. 2014, 63 pages.
3GPP TS 36.211 V10.4.0, "3$^{rd}$ Generation Partnership Project; Technical Specification Group Radio Access Network; Evolved Universal Terrestrial Radio Access (E-UTRA); Physical Channels and Modulation (Release 10)," Dec. 2011, 101 pages.
3GPP TS 36.211 V12.0.0, "3$^{rd}$ Generation Partnership Project; Technical Specification Group Radio Access Network; Evolved Universal Terrestrial Radio Access (E-UTRA); Physical Channels and Modulation (Release 12)," Dec. 2013, 120 pages.
3GPP TS 36.212 V10.4.0, "3$^{rd}$ Generation Partnership Project; Technical Specification Group Radio Access Network; Evolved Universal Terrestrial Radio Access (E-UTRA); Multiplexing and channel coding (Release 10)," Dec. 2011, 79 pages.
3GPP TS 36.212 V12.0.0, "3$^{rd}$ Generation Partnership Project; Technical Specification Group Radio Access Network; Evolved Universal Terrestrial Radio Access (E-UTRA); Multiplexing and channel coding (Release 12)," Dec. 2013, 88 pages.
3GPP TS 36.213 V10.4.0, "3$^{rd}$ Generation Partnership Project; Technical Specification Group Radio Access Network; Evolved Universal Terrestrial Radio Access (E-UTRA); Physical layer procedures (Release 10)," Dec. 2011, 123 pages.
3GPP TS 36.213 V12.0.0, "3$^{rd}$ Generation Partnership Project; Technical Specification Group Radio Access Network; Evolved Universal Terrestrial Radio Access (E-UTRA); Physical layer procedures (Release 12)," Dec. 2013, 186 pages.
3GPP TS 36.214 V11.1.0, "3$^{rd}$ Generation Partnership Project; Technical Specification Group Radio Access Network; Evolved Universal Terrestrial Radio Access (E-UTRA); Physical layer; Measurements (Release 11)," Dec. 2012, 14 pages.
3GPP TS 36.331 V12.1.0, "3$^{rd}$ Generation Partnership Project; Technical Specification Group Radio Access Network; Evolved Universal Terrestrial Radio Access (E-UTRA); Radio Resource Control (RCC); Protocol specification (Release 12)," Mar. 2014, 356 pages.
3GPP TS 36.423 V12.1.0, "3$^{rd}$ Generation Partnership Project; Technical Specification Group Radio Access Network; Evolved Universal Terrestrial Radio Access Network (E-UTRAN); X2 application protocol (X2AP) (Release 12)," Mar. 2014, 144 pages.
International Search Report dated Dec. 30, 2014, for corresponding International Application No. PCT/CN2014/074355, 2 pages.
MediaTek Inc., "New work item proposal for network assistance interference cancellation and suppression for LTE," RP-140519, 3GPP TSG RAN Meeting #63, Agenda Item: 14.1.1, Fukuoka, Japan, Mar. 3-6, 2014, 7 pages.
Sesia et al., "LTE The UMTS Long Term Evolution—From Theory to Practice," WILEY, 2009, Chapter 9, 31 pages.
Extended European Search Report, dated Sep. 15, 2017, for corresponding European Application No. 14888004.0-1874 / 3127385, 12 pages.
NSN, Nokia, "Network assistance for advanced receivers," R1-140576, 3GPP TSG RAN WG1 Meeting #76, Agenda Item: 7.2.9.2, Prague, Czech Republic, Feb. 10-14, 2014, 5 pages.
Panasonic, "Feasibility of dynamic assistance signalling and blind parameter detection," R1-140509, 3GPP TSG RAN WG1 Meeting #76, Agenda Item: 7.2.9.2, Prague, Czech Republic, Feb. 10-14, 2014, 5 pages.
Notice of Reasons for Rejection, dated Dec. 12, 2017, corresponding to Japanese Patent Application No. 2016-557052, 5 pages. (English Translation).

* cited by examiner

Semi-static switching
(higher-layer signalling)

Resource Block Assignment 941

Transport Block 1　　Transport Block 2
Information 610　　　Information 620

Resource Block Assignment 942

Reinterpretation of　　Transport Block 1　　Interference
Resource Allocation　　Information 630　　　Information 650
Header 990

INTERFERENCE PARAMETER SIGNALING FOR EFFICIENT INTERFERENCE CANCELLATION AND SUPPRESSION

The present invention relates to transmission of interference parameters from a serving node to a receiving device in a cellular communication system.

TECHNOLOGY BACKGROUND

Third generation (3G) mobile cellular systems, such as, for instance, universal mobile telecommunication systems (UMTS) standardized within the third generation partnership project (3GPP) have been based on wideband code division multiple access (WCDMA) radio access technology. Today, 3G systems are being deployed on a broad scale all around the world. After enhancing this technology by introducing high-speed downlink packet access (HSDPA) and an enhanced uplink, also referred to as high-speed uplink packet access (HSUPA), the next major step in evolution of the UMTS standard has brought the combination of orthogonal frequency division multiplexing (OFDM) for the downlink and single carrier frequency division multiplexing access (SC-FDMA) for the uplink. This system has been named long term evolution (LTE) since it has been intended to cope with future technology evolutions.

The LTE system represents efficient packet-based radio access and radio access networks that provide full IP-based functionalities with low latency and low cost. The downlink supports data modulation schemes QPSK, 16QAM, and 64QAM and the uplink supports QPSK, 16QAM, and at least for some devices also 64QAM, for physical data channel transmissions. The term "downlink" denotes direction from the network to the terminal. The term "uplink" denotes direction from the terminal to the network.

LTE's network access is extremely flexible, using a number of defined channel bandwidths between 1.4 and 20 MHz, contrasted with UMTS terrestrial radio access (UTRA) fixed 5 MHz channels. Spectral efficiency is increased by up to four-fold compared with UTRA, and improvements in architecture and signaling reduce round-trip latency. Multiple Input/Multiple Output (MIMO) antenna technology should enable 10 times as many users per cell as 3GPP's original WCDMA radio access technology. To suit as many frequency band allocation arrangements as possible, both paired (frequency division duplex FDD) and unpaired (time division duplex TDD) band operation is supported. LTE can co-exist with earlier 3GPP radio technologies, even in adjacent channels, and calls can be handed over to and from all 3GPP's previous radio access technologies.

An LTE network architecture including network entities and interfaces between them is exemplified in FIG. 1. As can be seen in FIG. 1, the LTE architecture supports interconnection of different radio access networks (RAN) such as UTRAN or GERAN (GSM EDGE Radio Access Network), which are connected to the EPC via the Serving GPRS Support Node (SGSN). In a 3GPP mobile network, the mobile terminal 110 (called User Equipment, UE, or device) is attached to the access network via the Node B (NB) in the UTRAN and via the evolved Node B (eNB) in the E-UTRAN access. The NB and eNB 120 entities are known as base stations in other mobile networks. There are two data packet gateways located in the EPS for supporting the UE mobility-Serving Gateway (SGW) 130 and Packet Data Network Gateway 160 (PDN-GW shortened to PGW). Assuming the E-UTRAN access, the eNB entity 120 may be connected through wired lines to one or more SGWs via the S1-U interface ("U" stays for "user plane") and to the Mobility Management Entity 140 (MME) via the S1-MMME interface. The SGSN 150 and MME 140 are also referred to as serving core network (CN) nodes.

As shown above, the E-UTRAN consists of an eNodeB, providing the E-UTRA user plane (PDCP/RLC/MAC/PHY) and control plane (RRC) protocol terminations towards the user equipment (UE). The eNodeB (eNB) hosts the Physical (PHY), Medium Access Control (MAC), Radio Link Control (RLC) and Packet Data Control Protocol (PDCP) layers that include the functionality of user-plane header-compression and encryption. It also offers Radio Resource Control (RRC) functionality corresponding to the control plane. It performs many functions including radio resource management, admission control, scheduling, enforcement of negotiated uplink Quality of Service (QoS), cell information broadcast, ciphering/deciphering of user and control plane data, and compression/decompression of downlink/uplink user plane packet headers. The eNBs are interconnected with each other by means of the X2 interface.

FIG. 2 illustrates structure of a component carrier in LTE Release 8 and later releases. The downlink component carrier of the 3GPP LTE Release 8 is subdivided in the time-frequency domain in so-called subframes each of which is divided into two downlink slots, one of which is shown in FIG. 2 as corresponding to a time period $T_{slot}$. The first downlink slot comprises a control channel region within the first OFDM symbol(s). Each subframe consists of a given number of OFDM symbols in the time domain, each OFDM symbol spanning over the entire bandwidth of the component carrier.

In particular, the smallest unit of resources that can be assigned by a scheduler is a resource block also called physical resource block (PRB). A PRB is defined as $N_{symb}^{DL}$ consecutive OFDM symbols in the time domain and $N_{sc}^{RB}$ consecutive subcarriers in the frequency domain. In practice, the downlink resources are assigned in resource block pairs. A resource block pair consists of two resource blocks. It spans $N_{sc}^{RB}$ consecutive subcarriers in the frequency domain and the entire $2 \cdot N_{symb}^{DL}$ modulation symbols of the subframe in the time domain. $N_{symb}^{DL}$ may be either 6 or 7 resulting in either 12 or 14 OFDM symbols in total. Consequently, a physical resource block consists of $N_{symb}^{DL} \times N_{sc}^{RB}$ resource elements corresponding to one slot in the time domain and 180 kHz in the frequency domain (further details on the downlink resource grid can be found, for example, in 3GPP TS 36.211, *"Evolved universal terrestrial radio access (E-UTRA); physical channels and modulations (Release 10)"*, version 10.4.0, 2012, Section 6.2, freely available at www.3gpp.org, which is incorporated herein by reference). While it can happen that some resource elements within a resource block or resource block pair are not used even though it has been scheduled, for simplicity of the used terminology, the whole resource block or resource block pair is still assigned. Examples for resource elements that are actually not assigned by a scheduler include reference signals, broadcast signals, synchronization signals, and resource elements used for various control signal or channel transmissions.

The number of physical resource blocks $N_{RB}^{DL}$ in downlink depends on the downlink transmission bandwidth configured in the cell and is at present defined in LTE as being from the interval of 6 to 110 (P)RBs. It is common practice in LTE to denote the bandwidth either in units of Hz (e.g., 10 MHz) or in units of resource blocks; e.g., for the downlink case the cell bandwidth can equivalently be expressed as, e.g., 10 MHz or $N_{RB}^{DL}=50$ RB.

Generally, it may be assumed that a resource block designates the smallest resource unit on an air interface of a mobile communication that can be assigned by a scheduler for transmitting data. The dimensions of a resource block may be any combination of time (e.g., time slot, subframe, frame, etc., for time division multiplex (TDM)), frequency (e.g., sub-band, carrier frequency, etc., for frequency division multiplex (FDM)), code (e.g., spreading code for code division multiplex (CDM)), antenna (e.g., Multiple Input Multiple Output (MIMO)), etc., depending on the access scheme used in the mobile communication system.

In 3GPP LTE Release 8 the downlink control signalling is basically carried by the following three physical channels:

Physical control format indicator channel (PCFICH) for indicating the number of OFDM symbols used for control signalling in a subframe (i.e., the size of the control channel region);

Physical hybrid ARQ indicator channel (PHICH) for carrying the downlink ACK/NACK associated with uplink data transmission; and Physical downlink control channel (PDCCH) for carrying downlink scheduling assignments and uplink scheduling assignments.

The PCFICH is sent from a known position within the control signalling region of a downlink subframe using a known pre-defined modulation and coding scheme. The user equipment decodes the PCFICH in order to obtain information about a size of the control signalling region in a subframe, for instance, the number of OFDM symbols. If the user equipment (UE) is unable to decode the PCFICH or if it obtains an erroneous PCFICH value, it will not be able to correctly decode the L1/L2 control signalling (PDCCH) comprised in the control signalling region, which may result in losing all resource assignments contained therein.

The PDCCH carries downlink control information, such as, for instance, scheduling grants for allocating resources for downlink or uplink data transmission. The PDCCH for the user equipment is transmitted on the first of either one, two or three OFDM symbols according to PCFICH within a subframe.

Physical downlink shared channel (PDSCH) is used to transport user data. PDSCH is mapped to the remaining OFDM symbols within one subframe after PDCCH. The PDSCH resources allocated for one UE are in the units of resource block for each subframe.

Physical uplink shared channel (PUSCH) carries user data. Physical Uplink Control Channel (PUCCH) carries signalling in the uplink direction such as scheduling requests, HARQ positive and negative acknowledgements in response to data packets on PDSCH, and channel state information (CSI).

User data (IP packets) to be transmitted over the communication network may be generated by the user application. They may include speech, video, text, or any other media, possibly compressed and encapsulated into other protocols before forming the IP packets. The IP packets are in EUTRAN further processed on the PDCP layer resulting in addition of a PDCP header. The PDCP packets formed in this manner are further segmented and/or reassembled into RLC packets to which an RLC header is added. One or more RLC packets are then encapsulated into a MAC packet including also a MAC header and padding, if necessary. The MAC packet is also called "transport block". Thus, a transport block is, from the point of view of the physical layer, a packet of user data entering the physical layer. There are predefined transport block sizes (TBS) which may be used in LTE. The transport block is then within one transmission time interval (TTI) mapped onto the subframes on the physical layer (PHY). Details of the mapping of data starting with transport blocks up to the interleaving is shown in FIGS. 5.2.2-1 and 5.3.2-1 and described in the related description of the 3GPP TS 36.212, v.10.4.0, "*Evolved universal terrestrial radio access (E-UTRA)*; *Multiplexing and channel coding*" available freely at www.3gpp.org and incorporated herein by reference, for the uplink and downlink transmission of user data, respectively. Furthermore, the physical channel mapping is described in detail in FIGS. 6.3-1 and FIGS. 5.3-1 for downlink and uplink, respectively, and the related description in 3GPP TS 36.211, v10.4.0.

The principle of link adaptation is fundamental to the design of a radio interface which is efficient for packet-switched data traffic. Unlike the early versions of UMTS (Universal Mobile Telecommunication System), which used fast closed-loop power control to support circuit-switched services with a roughly constant data rate, link adaptation in LTE adjusts the transmitted data rate (modulation scheme and channel coding rate) dynamically to match the prevailing radio channel capacity for each user.

For the downlink data transmissions in LTE, the eNodeB typically selects the modulation scheme and code rate (MCS) depending on a prediction of the downlink channel conditions. An important input to this selection process is the Channel State Information (CSI) feedback (mentioned above) transmitted by the User Equipment (UE) in the uplink to the eNodeB.

Channel state information is used in a multi-user communication system, such as for example 3GPP LTE, to determine the quality of channel resource(s) for one or more users. In general, in response to the CSI feedback the eNodeB can select between QPSK, 16-QAM and 64-QAM schemes and a wide range of code rates. This CSI information may be used to aid in a multi-user scheduling algorithm to assign channel resources to different users, or to adapt link parameters such as modulation scheme, coding rate or transmit power, so as to exploit the assigned channel resources to its fullest potential.

The uplink and downlink resource grants (grants enabling the UE to transmit data in downlink and uplink, respectively) are transmitted from the eNodeB to the UE in a downlink control information (DCI) via PDCCH. The downlink control information may be transmitted in different formats, depending on the signaling information necessary. In general, the DCI may include:

a resource block assignment (RBA), modulation and coding scheme (MCS).

It may include further information, depending on the signaling information necessary, as also described in Section 9.3.2.3 of the book "*LTE: The UMTS Long Term Evolution from theory to practice*" by S. Sesia, I. Toufik, M. Baker, April 2009, John Wiley & Sons, ISBN 978-0-470-69716-0, which is incorporated herein by reference. For instance, the DCI may further include HARQ related information such as redundancy version (RV), HARQ process number, or new data indicator (NDI); MIMO related information such as pre-coding; power control related information, etc.

As described above, in order to inform the scheduled users about their allocation status, transport format and other data-related information (e.g., HARQ information, transmit power control (TPC) commands), L1/L2 control signaling is transmitted on the downlink along with the data. L1/L2 control signaling is multiplexed with the downlink data in a subframe, assuming that the user allocation can basically change from subframe to subframe. It should be noted that user allocation might also be performed on a TTI (Transmission Time Interval) basis, where the TTI length can be in general a multiple of the subframes or correspond to a subframe. The TTI length may be fixed in a service area for all users, may be different for different users, or may even be dynamic for each user. Generally, the L1/2 control signaling needs only be transmitted once per TTI. Without loss of generality, the following assumes that a TTI is equivalent to one subframe.

The L1/L2 control signaling is transmitted on the Physical Downlink Control Channel (PDCCH). A PDCCH carries a message as a Downlink Control Information (DCI), which in most cases includes resource assignments (allocations) and other control information for a mobile terminal or groups of UEs. In general, several PDCCHs can be transmitted in one subframe. It should be noted that in 3GPP LTE, assignments for uplink data transmissions, also referred to as uplink scheduling grants or uplink resource assignments, are also transmitted on the PDCCH. Generally, the information sent on the L1/L2 control signaling for assigning uplink or downlink radio resources (particularly LTE(-A) Release 10) can be categorized to the following items:

- User identity, indicating the user that is allocated. This is typically included in the checksum by masking the CRC with the user identity. Then, the users (UEs) perform blind decoding by demasking the identities transmitted in the search space (i.e., in the resources configured as search space in which the respective terminals have to monitor the control information whether there is data for them).
- Resource allocation information, indicating the resources (Resource Blocks, RBs) on which a user is allocated. Note, that the number of RBs on which a user is allocated can thus be dynamic. In particular, the number of the resource blocks (frequency domain) is carried by the resource allocation information. The position in the time domain (subframe) is given by the subframe in which the PDCCH is received and a predefined rule (the resources are allocated fixed number of subframes after the PDCCH subframe).
- Carrier indicator, which is used if a control channel transmitted on a first carrier assigns resources that concern a second carrier, i.e., resources on a second carrier or resources related to a second carrier if carrier aggregation is applied.
- Modulation and coding scheme that determines the employed modulation scheme and coding rate (length of the transport block to be coded).
- HARQ information such as a new data indicator (NDI) and/or a redundancy version (RV) that is particularly useful in retransmissions of data packets or parts thereof. In particular, new data indicator indicated whether the allocation is for an initial transmission of data or for a retransmission of data. Redundancy version indicates the coding applied to the retransmitted data (in LTE incremental redundancy combining is supported, meaning that each retransmission may include the data of the first transmission differently coded, i.e., may include parity bits which together with the already received transmission/retransmission(s) finally enable decoding).
- Power control commands to adjust the transmit power of the assigned uplink data or control information transmission.
- Reference signal information such as the applied cyclic shift and/or orthogonal cover code index, which are to be employed for transmission or reception of reference signals related to the assignment.
- Uplink or downlink assignment index that is used to identify an order of assignments, which is particularly useful in TDD systems.
- Hopping information, e.g., an indication whether and how to apply resource hopping in order to increase the frequency diversity.
- CSI request, which is used to trigger the transmission of channel state information in an assigned resource.
- Multi-cluster information, which is a flag used to indicate and control whether the transmission occurs in a single cluster (contiguous set of RBs) or in multiple clusters (at least two non-contiguous sets of contiguous RBs). Multi-cluster allocation has been introduced by 3GPP LTE-(A) Release 10.

It is to be noted that the above listing is non-exhaustive, and not all mentioned information items need to be present in each PDCCH transmission, depending on the DCI format that is used.

Downlink control information occurs in several formats that differ in overall size and also in the information contained in its fields. The different DCI formats that are currently defined for LTE are as follows and described in detail in 3GPP TS 36.212, v.12.0.0 "Multiplexing and channel coding", section 5.3.3.1 (available at http://www.3gpp.org and incorporated herein by reference). For instance, DCI Format 0 is used for the transmission of resource grants for the PUSCH, using single-antenna port transmissions in uplink transmission mode 1 or 2.

In order for the UE to identify whether it has received a PDCCH transmission correctly, error detection is provided by means of a 16-bit CRC appended to each PDCCH (i.e., DCI). Furthermore, it is necessary that the UE can identify which PDCCH(s) are intended for it. This could in theory be achieved by adding an identifier to the PDCCH payload; however, it turns out to be more efficient to scramble the CRC with the "UE identity", which saves the additional overhead. The CRC may be calculated and scrambled as defined in detail by 3GPP in TS 36.212, Section 5.3.3.2 "CRC attachment", incorporated hereby by reference. The section describes how error detection is provided on DCI transmissions through a Cyclic Redundancy Check (CRC). A brief summary is given below. The entire payload is used to calculate the CRC parity bits. The parity bits are computed and attached. In the case where UE transmit antenna selection is not configured or applicable, after attachment, the CRC parity bits are scrambled with the corresponding RNTI.

The scrambling may further depend on the UE transmit antenna selection, as apparent from TS 36.212. In the case where UE transmit antenna selection is configured and applicable, after attachment, the CRC parity bits are scrambled with an antenna selection mask and the corresponding RNTI. As in both cases the RNTI is involved in the scrambling operation, for simplicity and without loss of generality the following description of the embodiments simply refers to the CRC being scrambled (and descrambled, as applicable) with an RNTI, which should therefore be understood as notwithstanding, e.g., a further element in the scrambling process such as an antenna selection mask.

Correspondingly, the UE descrambles the CRC by applying the "UE identity" and, if no CRC error is detected, the UE determines that PDCCH carries its control information intended for itself. The terminology of "masking" and "de-masking" is used as well, for the above-described process of scrambling a CRC with an identity. The "UE identity" mentioned above with which the CRC of the DCI may be scrambled can also be a SI-RNTI (System Information Radio Network Temporary Identifier), which is not a "UE identity" as such, but rather an identifier associated with the type of information that is indicated and transmitted, in this case the system information. The SI-RNTI is usually fixed in the specification and thus known a priori to all UEs.

The physical downlink control channel (PDCCH) carries, e.g., scheduling grants for allocating resources for downlink or uplink data transmission. Multiple PDCCHs can be transmitted in a subframe. The PDCCH for the user equipments is transmitted on the first $N_{symb}^{PDCCH}$ OFDM symbols (usually either 1, 2 or 3 OFDM symbols as indicated by the PCFICH, in exceptional cases either 2, 3, or 4 OFDM symbols as indicated by the PCFICH) within a subframe, extending over the entire system bandwidth; the system bandwidth is typically equivalent to the span of a cell or component carrier. The region occupied by the first $N_{symb}^{PDCCH}$ OFDM symbols in the time domain and the $N_{RB}^{DL} \times N_{sc}^{RD}$ subcarriers in the frequency domain is also referred to as PDCCH region or control channel region. The remaining $N_{symb}^{PDSCH} = 2 \cdot N_{symb}^{DL} - N_{symb}^{PDCCH}$ OFDM symbols in the time domain on the $N_{RB}^{DL} \times N_{sc}^{RD}$ subcarriers in the frequency domain is referred to as the PDSCH region or shared channel region (see below).

For a downlink grant (i.e., resource assignment) on the physical downlink shared channel (PDSCH), the PDCCH assigns a PDSCH resource for (user) data within the same subframe. The PDCCH control channel region within a subframe consists of a set of Control Channel Elements, CCEs where the total number of CCEs in the control region of subframe is distributed throughout time and frequency control resource. Multiple CCEs can be combined to effectively reduce the coding rate of the control channel. CCEs are combined in a predetermined manner using a tree structure to achieve different coding rate. Control channel elements are separately allocable units smaller than the entire physical resource block. They enable finer resource assignment for the control channel in which smaller amounts of data are transported.

On a transport channel level, the information transmitted via the PDCCH is also referred to as L1/L2 control signaling (for details on L1/L2 control signaling see above).

For uplink resource assignments (for transmissions on the Physical Uplink Shared CHannel (PUSCH)) signaled on PDCCH in LTE, the L1/L2 control information does not contain a HARQ process number, since a synchronous HARQ protocol is employed for LTE uplink. The HARQ process to be used for an uplink transmission is given by the timing. Furthermore it should be noted that the redundancy version (RV) information is jointly encoded with the transport format information, i.e., the RV info is embedded in the transport format (TF) field. The TF respectively modulation and coding scheme (MCS) field has for example a size of bits, which corresponds to 32 entries. 3 TF/MCS table entries are reserved for indicating RVs 1, 2 or 3. The remaining MCS table entries are used to signal the MCS level (TBS) implicitly indicating RV0.

For details on the TBS/RV signaling for uplink assignments on PDCCH please see 3GPP TS 36.213, "Evolved Universal Terrestrial Radio Access (E-UTRA); Physical layer procedures", version 3GPP TS 36.213, v.10.4.0, 2012 (available at http://www.3gpp.org and incorporated herein by reference). The size of the CRC field of the PDCCH is 16 bits.

For downlink assignments (PDSCH) signaled on PDCCH in LTE the Redundancy Version (RV) is signaled separately in a two-bit field. Furthermore the modulation order information is jointly encoded with the transport format information. Similar to the uplink case there is 5 bit MCS field signaled on PDCCH. Three of the entries are reserved to signal an explicit modulation order, providing no Transport format (Transport block) info. For the remaining 29 entries modulation order and Transport block size info are signaled.

The idea behind the concept of interference cancellation and interference suppression is that the effective signal to interference power ratio in the receiver can be increased if the interference fraction of the received signal can be removed or suppressed in the receiver. In order to achieve this, the knowledge of the type and strength of the interference is beneficial.

FIG. 4 illustrates the basic concept of interference cancellation in the receiver. A signal S is generated by the receiver and transmitted over a channel. During the transmission it is superimposed by interference I and noise N. This results in a disturbed signal which is inputted to a receiver and which may lead to some bit errors in the demodulator. In order to improve the reception and in particular, the bit error rate resulting from demodulation and decoding, interference cancellation (marked by a dashed rectangle in FIG. 4) may be applied. In particular, an interference estimation I' available in the receiver is used to recover signal S' which is further used as an input for the demodulator, reducing therewith the bit error rate. In this example, the recovery is achieved by subtracting the estimated interference signal I' form the received signal S+N+I. The performance of interference cancellation strongly depends on the accuracy of the interference estimation I'. In case of a very inaccurate interference estimation which corresponds to a large difference between I and I', it could even result in an increased disturbance of the demodulator input yielding an increased bit error rate.

The interference I is determined by a combination of some transmission (interference) parameters. The accuracy of the interference estimation I' increases with the amount of information regarding the interference parameters that is available on the receiver side.

FIG. 5 shows a typical scenario with interference from a single dominant interfering cell. UEs 501, 502, 503 and 504 are served by an eNB A and experience interference from eNB B. UE 501 and UE 502 experience weak interference from eNB B since they are far away from the interference source (eNB B), while UE 503 and UE 504 experience strong interference from eNB B. The dashed circle 500 indicates the area, in which the interference from the eNB B is dominant for the terminals served by the eNB A. For the purpose of improving the reception quality in the terminals located within the area 500, the interference cancellation and thus also the accuracy of the interference estimation may be essential.

Recently, 3GPP initiated a study item concerning network assisted interference cancellation and suppression (NAICS) for the downlink in 3GPP LTE systems. Details are described in 3GPP TR 36.866 v12.0.0, March 2014, "Study on Network-Assisted Interference Cancellation and Suppression (NAIC) for LTE" (referred to as "NAICS technical report" in the following). Based thereon, a subsequent work item is supposed to specify inclusion of the network assisted interference cancellation into the standard, as can be seen from RP-140519, "New work item proposal for network assistance interference cancellation and suppression for LTE", 3GPP RAN#63, March 2014, referred to as "NAICS work item" in the following.

The parameters in an LTE system which influence the interference (interference parameters) comprise Position of reference signals (pilot) within the resource grid of the interfering transmission (e.g., by eNB B of FIG. 5), Effective interference channel including precoding on the interference transmitter side, Interferer resource allocation in terms of allocated resources (PRBs, CFI, etc.), Number of spatial transmission layers of the interfering transmission, Modulation order of the interfering transmission, Channel coding parameters of the interfering transmission (code rate, redundancy version, etc.).

The amount of required interference information depends hereby on the receiver type. The receiver types investigated at 3GPP range from receivers that suppress the interference by means of spatial filtering of the sum signal to receivers that perform the complete decoding of code words transmitted by the interference source.

A receiver that performs merely an interference suppression by means of spatial filtering of the received signal (e.g., E-LMMSE-IRC in the NAICS technical report, Section 7.2) requires only information about the effective interference channel (including precoding on the interference transmitter side) per spatial layer, while information about modulation and coding scheme, redundancy version, etc., are not required.

On the other hand, a receiver that performs interference cancellation either on symbol (SL-IC, cf. NAICS technical report, Section 7.4) or on code word level (CW-IC, cf. NAICS technical report, Section 7.4) requires a significantly extended amount of interference information. In particular, on the receiver side it has to be known which modulation symbol was transmitted in order to perform effective interference cancellation as shown in FIG. 4. A detailed description of the receiver types studied at 3GPP RAN1 within the scope of NAISC is given in the NAICS cf. NAICS technical report cited above. Accordingly, also different approaches can be considered for obtaining interference parameters in LTE system:

Blind detection: The interference parameters are estimated within the receiver by means of hypothesis testing. This approach does not involve any network assistance but constitutes increased computation complexity in the receiver. Depending on which parameters have to be determined, the additional complexity can be significant. The advantage of such an approach is that no additional signalling is required.

Overhearing of control signals (DCI, reference signals, etc.) from interfering eNB: The interference parameters are determined in the receiver by listening to existing control signals from the interfering cell itself. This does not require any additional network assistance since the transmission parameters of the interfering signal are already provided to UEs associated to the interfering eNB. The disadvantage of this approach is that the UE has to be able to receive signals from both serving and interfering eNB in parallel. It furthermore requires a significant amount of blind detection of signals from the interfering cell, which increases the implementation complexity of the receiver.

L1 signalling from interfering eNB: This approach addresses the introduction of new L1 (physical layer) signalling for the provision of interference information. This control information would be transmitted by the interfering eNB and received by interference victim UEs that are associated to a neighboring eNB. The disadvantage of this approach is that the UE has to be able to receive signals from both serving and interfering eNB in parallel.

Higher-layer signalling from serving eNB: Interference information is provided to the interference victim UE by the serving eNB by means of downlink control messages on MAC layer or above. The serving eNB has knowledge of the transmission parameters used in the interfering cell due to backhaul communication. Due to the latency involved in higher-layer signalling, the approach can only be applied for interference parameters that do not change frequently.

L1 signalling from serving eNB: Interference information is provided to the interference victim UE by the serving eNB by means of downlink control signalling on the physical layer. The serving eNB has knowledge of the transmission parameters used in the interfering cell due to backhaul communication. In contrast to using higher-layer signalling, the interference information can be updated more frequently if the backhaul connection between serving and interfering eNB meets the required delay and capacity needs. A crucial precondition of this approach is a backhaul connection with sufficient capacity and latency. The preferred use case would therefore be intra-site coordination or coordination for remote radio heads (RRH).

Thus, each of the above approaches for obtaining the interference parameters have their advantages and disadvantages.

SUMMARY OF THE INVENTION

It is the aim of the present invention to provide an efficient manner of obtaining at the receiver the interference parameters to be used in interference suppression.

This invention provides a solution for providing information regarding interference parameters to the receivers by means of explicit signalling of interference parameters or sets of interference parameter candidates. The interference information is provided by means of L1 signalling from the serving eNB to the controlled device (such as a terminal, DCI receiving device).

This is achieved by the features as set forth in the independent claims.

Preferred embodiments of the present invention are the subject matter of the dependent claims.

The particular approach of the present invention is to provide the interference parameters within a downlink control information. Based on the interference parameters, the receiving device can estimate the interference and employ the estimate in cancellation procedure.

In accordance with an aspect of the present invention, an apparatus is provided for receiving data from a serving base station in a cellular communication system, the apparatus comprising: a blind decoding unit for identifying and decoding a downlink control information transmitted by the serving base station, an extraction unit for extracting from a first field of the downlink control information a scheduling control information and from a second field of the downlink control information an interference information, and a transceiver for receiving or transmitting data on resources specified by the scheduling information while taking into account the interference information so as to reduce the interference caused by transmitters other than the serving base station.

In accordance with another aspect of the invention, an apparatus is provided for transmitting data to a receiving device in a cellular communication system, the apparatus being a serving base station for the receiving device, comprising: an interference information determining unit for determining the interference experienced by the receiving device caused by transmitters other than the serving base station, a control information generation unit for generating a downlink control information including a first field including a scheduling control information and a second field including the interference information, and a transmitter for transmitting to the receiving device for blind decoding the generated downlink control information, and for receiving or transmitting data from/to the receiving device on resources specified by the scheduling information.

In accordance with another aspect of the invention, a method is provided for receiving data from a serving base station in a cellular communication system, the method comprising the steps of: blind decoding for identifying and decoding a downlink control information transmitted by the serving base station, extracting from a first field of the downlink control information a scheduling control information and from a second field of the downlink control information an interference information, and receiving or transmitting data on resources specified by the scheduling information while taking into account the interference information so as to reduce the interference caused by transmitters other than the serving base station.

In accordance with another aspect of the invention, a method is provided for transmitting data to a receiving device in a cellular communication system, the apparatus being a serving base station for the receiving device, comprising: determining the interference experienced by the receiving device caused by transmitters other than the serving base station, generating a downlink control information including a first field including a scheduling control information and a second field including the interference information, and transmitting to the receiving device for blind decoding the generated downlink control information, and for receiving or transmitting data from/to the receiving device on resources specified by the scheduling information.

Advantageously, the scheduling information is a first scheduling information which indicates transmission parameters for a first transport block of data. Then in the second field of the downlink control information either the interference information or a second scheduling information which indicates transmission parameters for a second transport block of data is conveyed.

Alternatively, the scheduling information of the first field of the downlink control information is a first scheduling information which indicates transmission parameters for a first transport block of data, and the second field of the downlink control information conveys either the interference information and a reduced second scheduling information which indicates transmission parameters for a second transport block of data or only a complete second scheduling information which indicates transmission parameters for a second transport block of data.

In particular, the first and the second field may have the same sizes, each of the first and the second field may include a modulation and coding scheme subfield for indicating modulation and coding scheme (MCS), and the modulation and coding scheme subfield of the first field may be larger than the modulation and coding scheme subfield of the second field.

Moreover, a switching message may be provided on a protocol layer higher than the physical layer, the switching message indicating the format of the second field, namely whether or not the second field is to carry the interference information. This enables semi-static configuration of NAICS application and thus semi-static configuration of whether the interference parameters are to be included or not into the DCI.

Alternatively, a switching indication is provided on the physical layer, and the switching indication indicates the format of the second field, namely whether or not the second field is to carry the interference information. This enables dynamic configuration of information to be carried by the DCI, namely whether in the particular DCI the second field is to be interpreted as a scheduling information for the transport block or as interference parameters.

In accordance with an embodiment, the switching indication within a 3GPP LTE Release-11 downlink control information message, in the resource allocation header field, while it is assumed that Type 0 allocation applies. Advantageously, the resource allocation header interpretation is configured semi-statically by a layer higher than the physical layer, wherein the resource header is interpretable either as indicating Type 0 or Type 1 allocation or as indicating the switching indication.

In accordance with another embodiment, the switching indication is conveyed within the second field in that at least one codepoint among all possible values defined by a subset of bits of the second field indicates that the interference information is transmitted in the second field and all codepoints other than said at least one codepoint indicate that the interference information is not transmitted in the second field. Advantageously, the subset of bits takes either the value of said at least one codepoint or another value indicating redundancy version for the second transport block.

The downlink control information may include a resource block assignment field and can take any of the following formats: i) the resource block assignment field indicates resource assignment for the transmission, for which the scheduling information is transmitted; or ii) the resource block assignment field includes a first subfield (1580) indicating resource assignment for the transmission, for which the scheduling information is transmitted, and a second subfield (1590) indicating whether or not the interference information in the second field is to be applied for interference cancellation for the respective resources specified in the first subfield (1580).

Advantageously, in case of format ii) the second subfield (1690) of the resource block assignment field indicates for the respective resources assigned in accordance with the first subfield whether a first interference information or a second interference information is to be applied to said respective assigned resources, and the second field includes a first subfield indicating the first set of interference parameters and a second subfield indicating the second set of interference parameters.

Moreover, within a protocol of a layer higher than the physical layer, a control information may be provided carrying a transmission mode, wherein the transmission mode can take a value which defines that the apparatus is to extract from the downlink control information the interference information as well as values which do not define that the apparatus is to extract the interference information from the downlink control information.

The decision on whether or not to provide the interference information within the downlink control information may be performed in a transmitter of the DCI (such as the serving base station) based on measurements of a reference signal, reported to the apparatus by the receiving device and/or based on load information of an interfering base station.

In accordance with another aspect of the present invention, a computer program product comprising a computer-readable medium having a computer-readable program code embodied thereon is provided, the program code being adapted to carry out the present invention.

According to an aspect of the present invention the above apparatus is embodies on an integrated circuit.

The above objectives and other objectives and features of the present invention will become more apparent from the following description and preferred embodiments, given in conjunction with the accompanying drawings in which.

DETAILED DESCRIPTION

Figure 5:
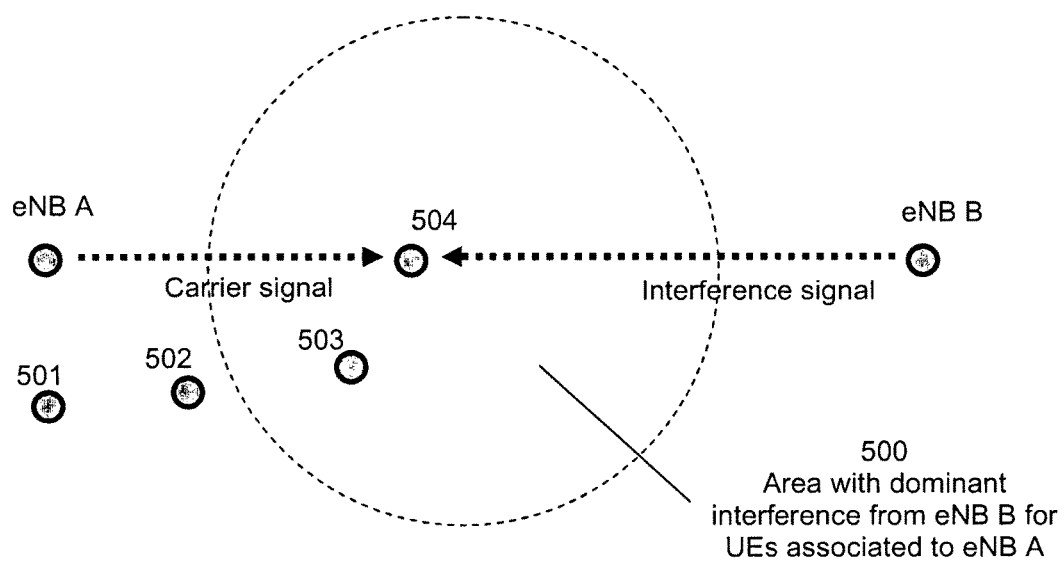
FIG. 5 is a schematic drawing illustrating different interference scenarios for terminals in the proximity of two base stations.

The present invention addresses the support of interference cancellation and suppression by means of network assistance. Interference cancellation and suppression on the UE side can significantly increase downlink user throughput due to increased PDSCH SINR. Knowledge of interference parameters is required on UE side for performing effective interference cancellation and suppression. The interference may be an inter-cell interference as illustrated on FIG. 5. Accordingly, a UE is served by a serving node (e.g., a base station, such as eNB for LTE system) and is exposed to interference from another node such as another base station controlling another respective cell. It is noted that the source of interference does not necessarily have to be a network node such as eNB. Rather, the interference may be generated also by relays or even by other terminals (especially in the uplink for the LTE), or by parallel transmissions to other receivers from the serving node itself.

The present invention provides a strategy for transmitting information concerning transmission parameters used in interfering neighboring cells and resulting in interference with the transmission between the victim UEs and the serving node. The victim UEs (UEs subjected to interference) may use this information for performing interference cancellation or suppression.

It is noted that the term "cellular system" or "cell" refer to any arrangement of a cell including macro cells, micro cells, pico cells, femto cells or any other concepts. The inter-cell interference may be also caused by hierarchically organized cells such as a macro cell including an area of a pico cell. Moreover, for the purpose of the invention, it is considered that a relay (which may also be a user terminal providing a relay function) coverage may also form a cell. Moreover, the interference to be suppressed may also be caused by interfering with other terminals.

In the context of LTE, the invention describes different strategies for providing the interference information together with PDSCH scheduling information for the interference victim UE within a single downlink control information (DCI) format. This can be achieved by reusing certain bits of existing LTE Release-11 DCI formats or by introducing one or more new DCI formats.

In particular, transmission parameters of the serving eNB are transmitted to the UE in the form of downlink control information (DCI) that is transmitted in physical downlink control channel(s) (PDCCH) or enhanced physical downlink control channels (E-PDCCH). A possible approach is to provide the interference information within a DCI format as well.

One approach could be the introduction of a new DCI format that contains only the interference information from a neighboring cell (or another interferers). However, using such an approach would mean that the interference victim UE (UE affected by the interference) has to receive two PDCCHs or EPDCCHs; one conveying the DCI with the PDSCH allocation information and an additional one conveying the DCI that contains the interference information. There are two problems connected with such an approach: (a) the need to receive two PDCCHs or E-PDCCHs requires additional blind DCI detection and decoding, and (b) the transmission of two PDCCHs or EPDCCHs results in an increased demand of transmission resources for downlink control signalling. The latter is given in the form of control channel elements (CCE) or enhanced control channel elements (ECCE) as defined in the LTE specification 3GPP TS 36.211 v12.0.0, December 2013, for instance in Section 6.8 and Section 6.8A.

DCI formats already defined in the LTE specification 3GPP TS 36.212, v 12.0.0, December 2013, Section 5.3.3.1, could be extended by bits that are used for the provision of interference information. The advantage compared to introducing a new DCI would be that no additional blind detection and decoding of PDCCHs or EPDCCHs is required since both PDSCH allocation information and interference information are provided within a single DCI format.

However, there are also two disadvantages connected with such an approach: (a) extending the DCI format size results in a reduced PDCCH or EPDCCH robustness due to increased size, and (b) the increased DCI format size could result in an increased demand for control channels elements (CCE/ECCE). The reduced robustness due to reduced channel coding rates form a critical issue since UEs that are candidates for interference cancellation or suppression are typically cell-edge UEs that experience low SINR levels.

The problem that has to be solved is the provision of interference information by the serving eNB in the form of L1 signalling by meeting following design targets:

Minimization of additional control overhead: The signalling solution should introduce as little as possible additional signalling overhead in the form of required CCEs/ECCEs.

Minimum specification and implementation changes: The implied 3GPP specification changes should be kept as small as possible in order to allow a smooth transition to new specification releases.

Avoidance of additional DCI blind decoding: The introduction of additional blind decoding effort for downlink control information should be avoided in order to keep the UE implementation complexity low.

Provision of interference information only if required: Interference information should only be provided to the UE when it is necessary. This requirement correlates with the need for minimization of control overhead.

According to the invention, the interference information is provided together with PDSCH scheduling within the same DCI format.

In particular, a method is provided for receiving data from or sending data to a serving base station in a cellular communication system. The method is performed at a receiving node such as a terminal and applies blind decoding for identifying and decoding a downlink control information DCI transmitted by the serving base station. Then, a step of extracting from a first field of the downlink control information scheduling control information and from a second field of the downlink control information an interference information is performed. Finally, the receiving node receives or transmits data on resources specified by the scheduling information while taking into account the interference information so as to reduce the interference caused by transmitters other than the serving base station.

Here, the term "blind decoding" refers to decoding of data transmissions without prior knowledge of corresponding transmissions parameters such as allocated resources and transport format (i.e., DCI format). In LTE, the number and/or the location of control channel elements (CCEs) used for the PDCCH transmissions is not known to the terminals in advance. In order to find its control information, a terminal tries to blindly decode the incoming control information assuming different combinations of CCEs and checking for the CRC. If the CRC matches, the terminal concludes that the PDCCH was directed to it and that the control information was decoded correctly. If the CRC does not match, then the terminal detects another location of CCEs. In order to keep the number of decoding attempts low, LTE uses a so-called search space for each terminal. The search space determines the combinations of CCEs that the terminal needs to monitor for a possible control information. The transmitters other than the serving base station/network node may be other base stations or relays or even other terminals.

This approach enables reusing bits within DCI formats which exist already in LTE Release-11, for the purpose of providing interference information to UEs.

The DCI formats that are used for the provision of interference information are the ones that are used in Release-11 for indicating PDSCH allocations with two transport blocks. A transport block conveys a single code word with individual channel coding. The scheduling of two transport blocks is used in LTE for transmissions on multiple spatial layers. The mapping of code words to transport blocks and the mapping of transport blocks to spatial layers is defined in Section 5.3.3.1 of the LTE specification 3GPP TS 36.212 v12.0.0, December 2013, and Section 6.3.3 of the LTE specification 3GPP TS 36.211 v12.0.0, December 2013, respectively.

The DCI formats that can be used for scheduling two transport blocks supported by the Release-11 are given below:

DCI format 2: Closed-loop spatial multiplexing or transmit diversity

DCI format 2A: Large delay CDD (cyclic delay diversity) or transmit diversity

DCI format 2B: Dual-layer transmission using antenna port 7 and 8 or single antenna port 7 or 8

DCI format 2C: Transmission on up to eight layers using antenna ports 7-14 or single antenna port 7 or 8

DCI format 2D: Transmission on up to eight layers using antenna ports 7-14 or single antenna port 7 or 8

Figure 1:
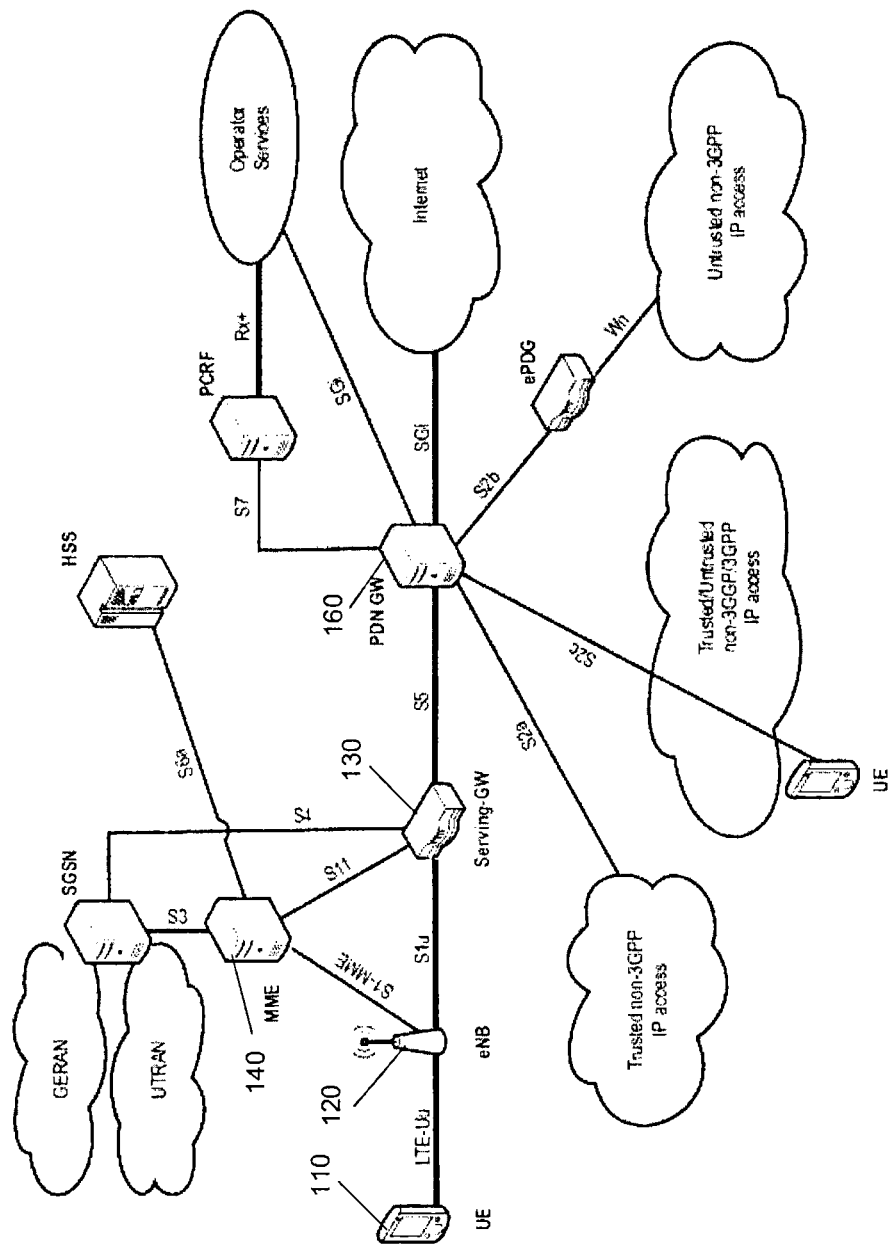
FIG. 1 is a block diagram illustrating an example of physical layer processing of four services in a digital broadcast system.
Figure 2:
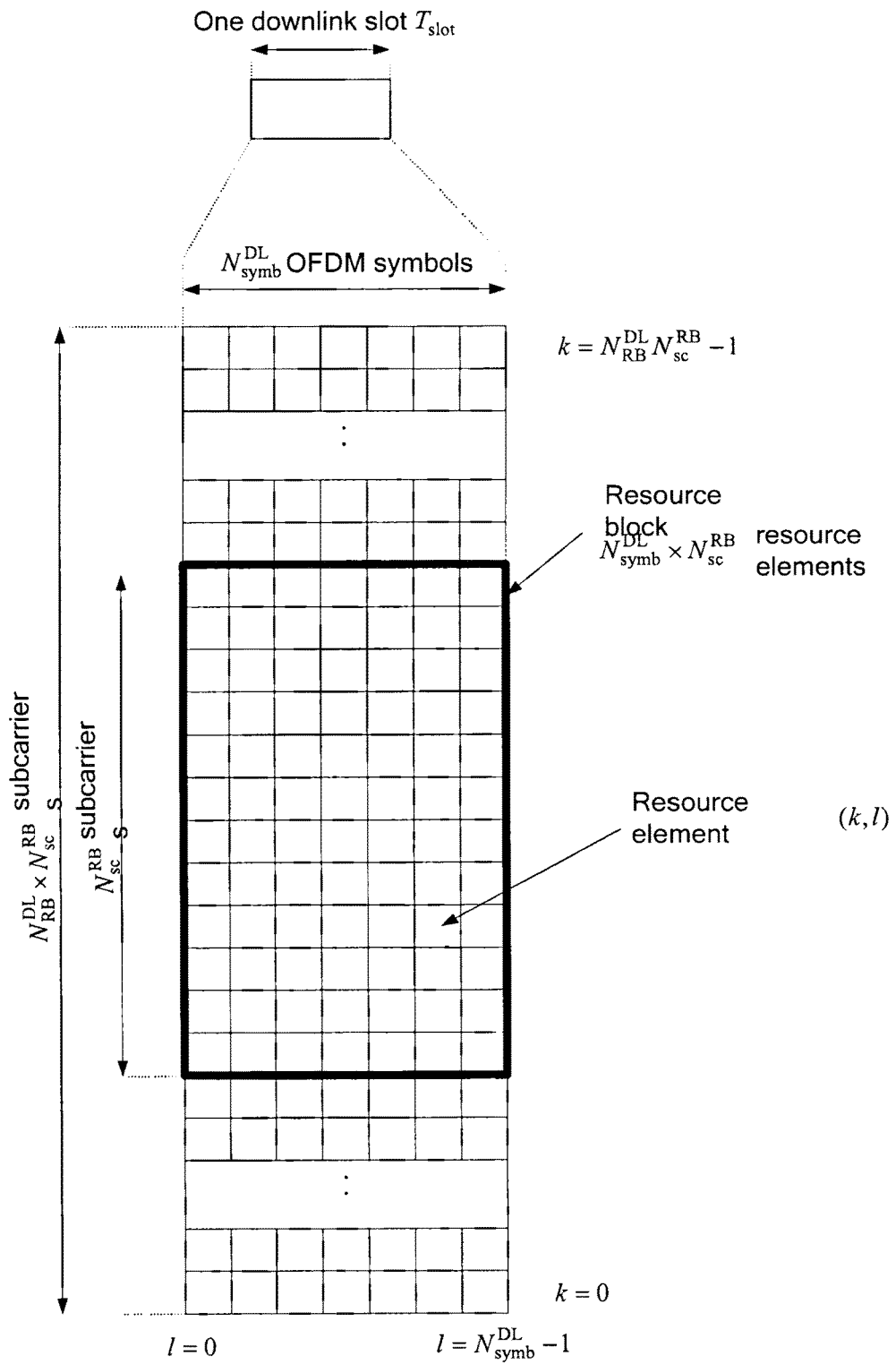
FIG. 2 is a schematic drawing illustrating an example of a grid of OFDM modulation resources in time and frequency domain.
Figure 3A:
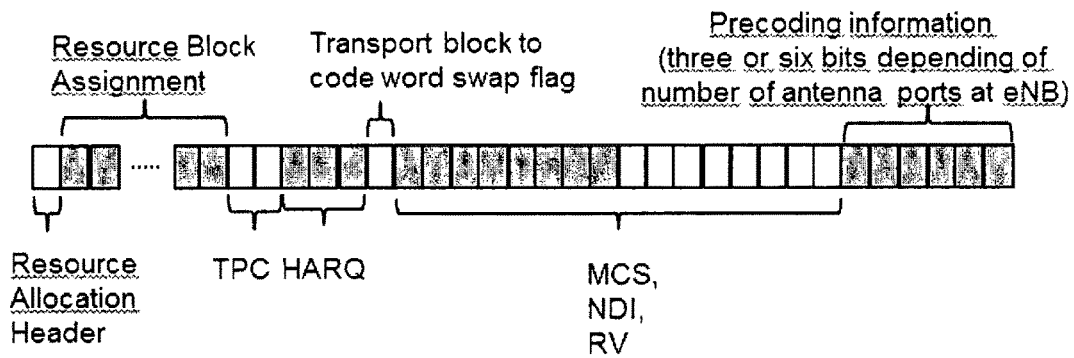
FIGS. 3A to 3E are schematic drawings illustrating respective DCI formats 2, 2A, 2B, 2C and 2D as used in LTE.

These formats are further illustrated in a simplified manner in the respective FIGS. 3A to 3E. In particular, FIG. 3A shows that DCI format 2 includes resource allocation header having a length of one bit, followed by resource block assignment field (RBA). RBA is a bitmap specifying for each (group of) PRBs whether the resources are assigned to the controlled node (such as terminal) or not. The DCI format 2 further includes a TPC (transmission power commands) information, HARQ configuration (process number), transport block to code word swap flag for assigning the two transport blocks to code words, and the scheduling information specific for each of the two transport blocks. The transport block specific scheduling information comprises eight bits and comprises modulation and coding scheme (MCS) indication, new data indicator (NDI) and redundancy version (RV) indication. Finally, the precoding information is signalled, which has a length of three or six bits depending in the number of antenna ports at the eNB and includes, for instance, rank indicator (RI) or the presiding matrix indicator (PMI).

Figure 3B:
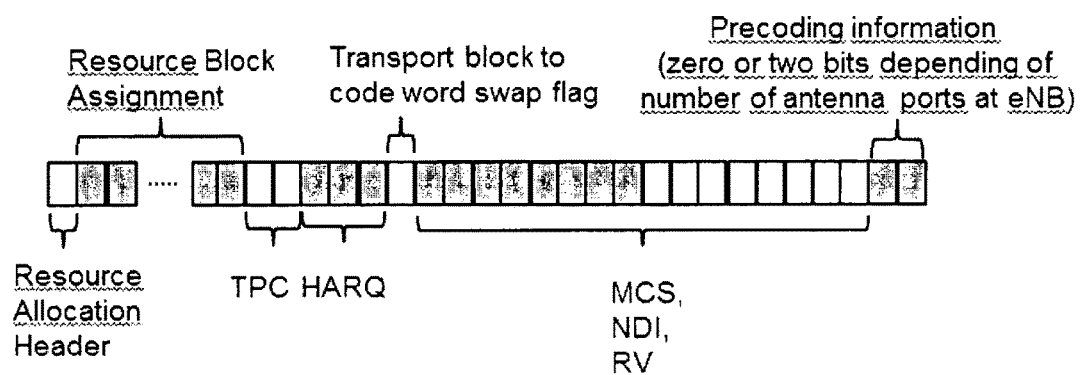
Figure 3C:
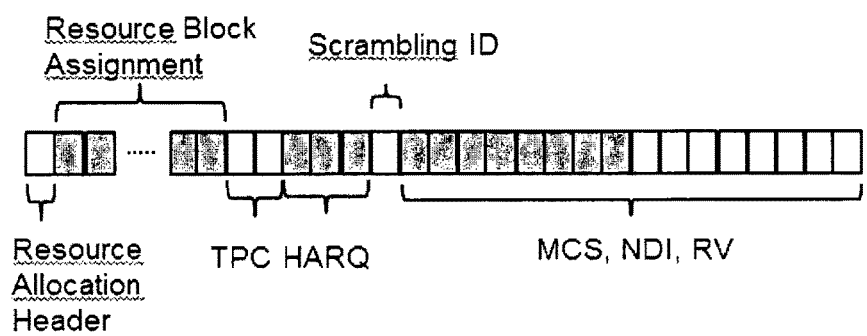
Figure 3D:
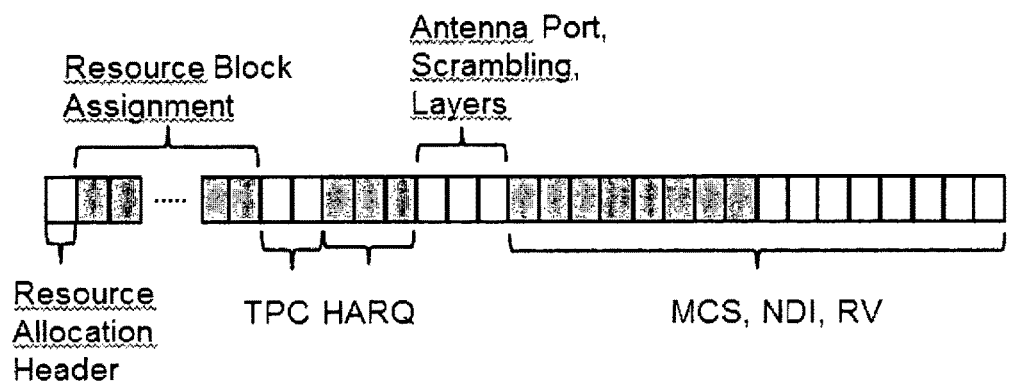
Figure 3E:
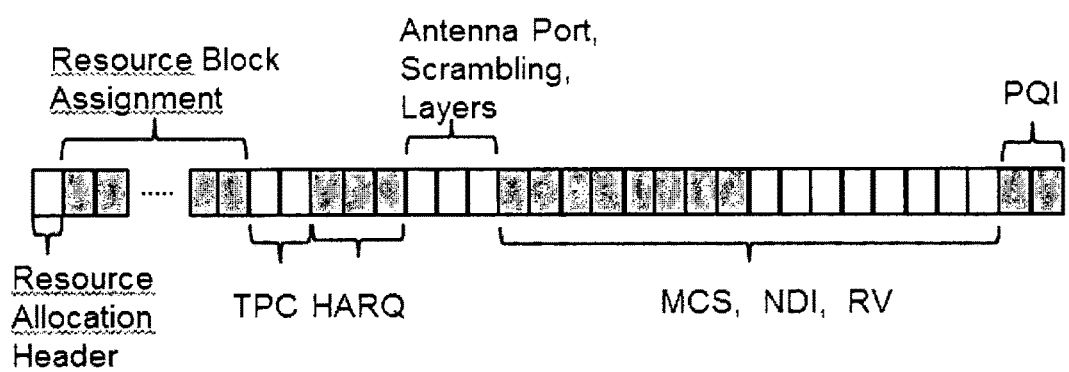

FIG. 3B shows DCI format 2A, which differs from the DCI format 2 in particular by shorter precoding information having zero or two bit length, depending in the number of antenna ports. FIG. 3C illustrates DCI format 2B which includes, apart from the resource allocation header, RBA, TCP and HARQ information and the scheduling information for the two transport blocks, a scrambling identity. FIG. 3D illustrates DCI format 2C, which differs from the format 2B in particular by including information concerning antenna ports, scrambling identity and number of layers. FIG. 3E illustrates DCI format 2D which, in addition to elements described with reference to format 2C, includes PQI (PDSCH Rate Matching and QuasiCoLocation Indicator) to inform the UE about the transmitting point or set of transmitting points.

However, it is noted that the present invention is not limited by reusing the existing DCI formats. A new DCI format may be defined alternatively, with the feature that it includes interference information within the second field.

According to an embodiment of the present invention, the scheduling information extracted from the first field of the downlink control information is a first scheduling information which indicates transmission parameters for a first transport block of data. The second field includes either the interference information or a second scheduling information which indicates transmission parameters for a second transport block of data.

Thus, in terms of LTE, a UE can be scheduled
either for a PDSCH transmission with two transport blocks. Here it is assumed that the interference is negligible, i.e., the UE is out of the area 500 illustrated in FIG. 5.
or for a PDSCH transmission with a single transport block in combination with providing interference information to the receiving UE.

Figure 4:
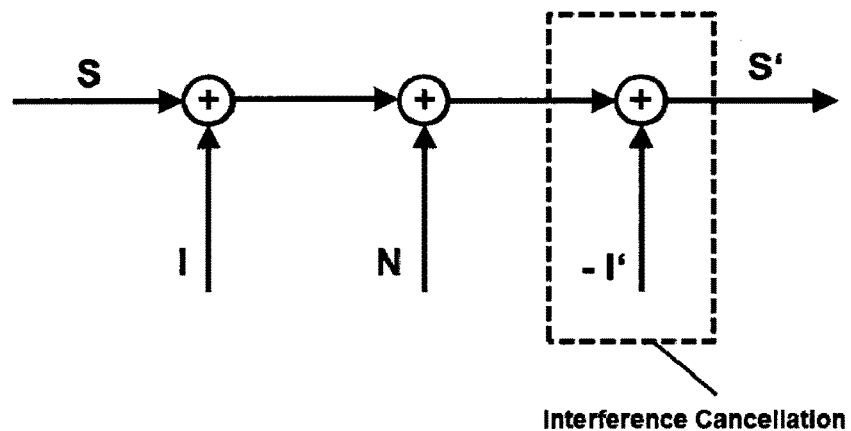
FIG. 4 is a block diagram illustrating interference cancellation at the receiver.
Figure 6:
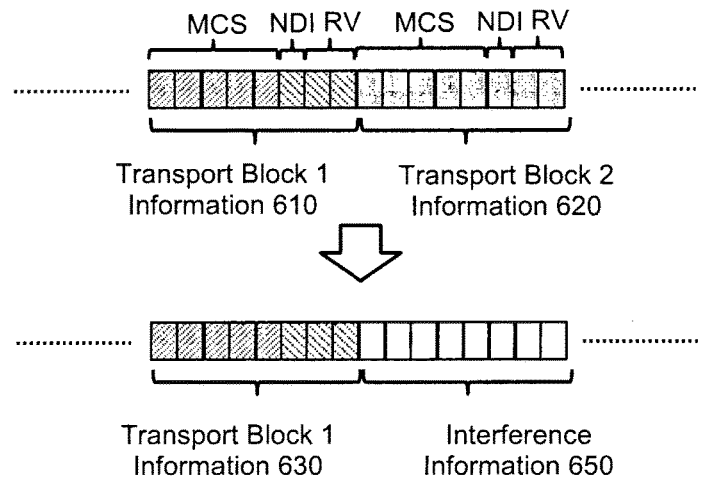
FIG. 6 is a schematic drawing illustrating mapping of the interference information on a DCI with format supporting two transport blocks.

FIG. 6 shows how the bits for one of the two transport blocks within a DCI format are used for providing interference information. The interpretation of the remaining bits of the DCI format is not changed. In particular, FIG. 6 shows the contents of the first field 610 of the downlink control information. The first field 610 carries scheduling information for the first transport block. The scheduling information contains modulation and coding scheme, new data indicator and redundancy version. The contents of the second field 620 includes the same type of scheduling information (MCS, NDI, RV) for the second transport block. Thus, the first field 610 and the second field 620 correspond to the current LTE DCI format. This format is advantageously further applied for terminals which experience rather low interference, e.g., interference which does not exceed a predefined threshold. If the terminals experience a high interference, e.g., interference exceeding a certain threshold, the format of the DCI's in this embodiment corresponds to the first field 630 and second field 650. Similarly to the first field 610, the first field 630 includes scheduling information for the first transport block. The length of the fields 610, 620, 630, and 640 is the same. However, the second field 650 does not include the information related to the second block, but rather the interference information for the receiving device. The interference information enables the receiving device to perform estimation of the interference, and thus to cancel or suppress the interference as illustrated in FIG. 4.

The effect of this approach is that a UE can only be provided with interference information if a single transport block is scheduled. If two transport blocks should be scheduled for the UE, interference information is not provided.

Figure 7:
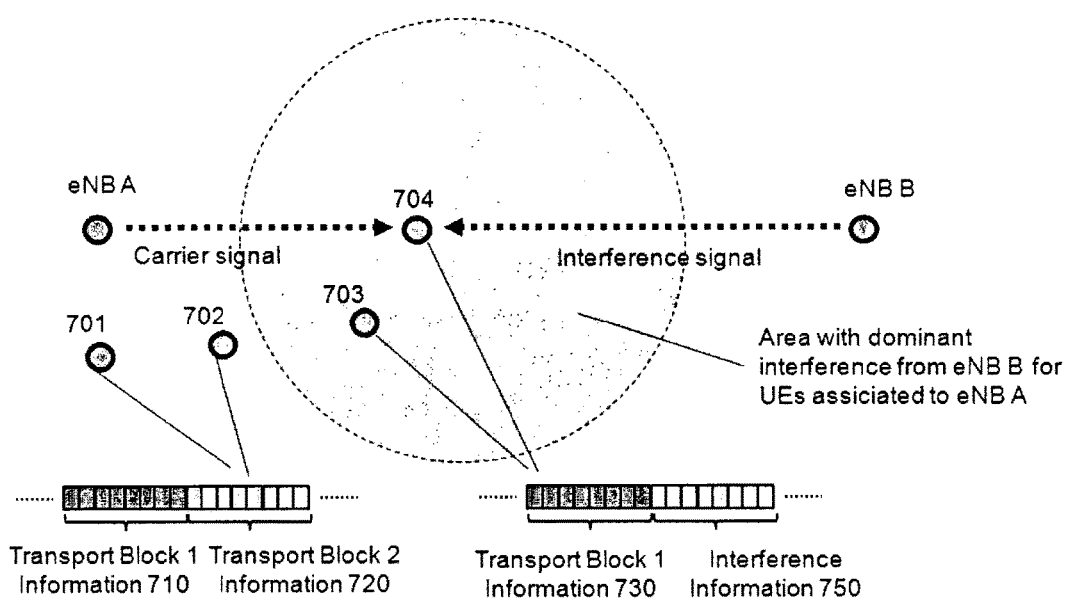
FIG. 7 is a schematic drawing illustrating inclusion of interference information into the DCI depending on the interference conditions of the terminals.

FIG. 7 shows the application of the basic concept in a typical NAICS scenario with inter-cell interference. The figure shows four different UE positions (701, 702, 703 and 704) where UEs at positions 701 and 702 do not experience strong inter-cell interference, while UEs at positions 703 and 704 are affected by strong interference. Since efficient interference cancellation or suppression of high interference power levels depends on the ability to obtain accurate interference estimations (I' in FIG. 4), it is reasonable to provide interference information only to UEs at positions 703 and 704. For UEs at positions 701 and 702, interference information is not required since the interference power level is very low and does hence not justify the use of interference cancellation, which requires additional computational capacity and thus also power.

The implied restriction of the present embodiment, namely that UEs at positions 703 and 704 cannot be scheduled for two transport blocks, is not expected to affect the system performance in a negative way. The scheduling of two transport blocks is used in LTE for transmissions on multiple spatial layers. Transmissions on multiple spatial layers are most beneficial in case of high SINR level, which corresponds to UEs located in the proximity of the cell-center and thus experience low interference power levels. On the other hand, the UEs located in the proximity of the cell edges experience high interference power levels and would thus rather be scheduled with single layer transmission in order to maximize the SINR.

Figure 8:
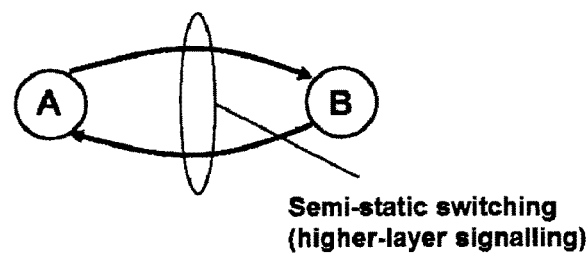
FIG. 8 is a schematic drawing illustrating switching between two formats of the DCI.

FIG. 8 shows an example of switching between DCI format interpretation states. In particular, FIG. 8 illustrates that the downlink control signalling for a UE configured for NAICS support can therefore be described by two states: state A in which DCI scheduling information is provided for two transport blocks and without interference information (610, 620), and state B in which DCI scheduling information is provided for a single transport block 630 and in addition, the interference information 650 is included.

There are different options for switching between these two configurations A and B. For instance, the switching may be performed by means of higher-layer signalling or by means of a dynamic indication within DCI formats.

In the first of these embodiments, the switching message is received on a protocol layer higher than the physical layer, and the switching message indicates the format of the second field, namely whether or not the second field is to carry the interference information. It is noted that the switching message may have any format, which enables to indicate whether or not the interference indication is to be included in the DCI. For instance, the switching message can be transmitted only if the DCI format (in particular, the fact whether or not the DC's for the particular UE are to include the interference information) changes. For instance, such switching message may be transmitted if the interference conditions of the receiving device change. The change may correspond to increase of the interference, so that it becomes useful/necessary to transmit the interference information. The change may also correspond to decrease of interference, so that it becomes unnecessary to transmit the interference information.

However, it is noted that the present invention is not limited to reusing the old DCI format. There may be a new DCI format, which includes the interference information. Such new DCI format may beneficially include information for a first transport block and the interference information as illustrated in FIG. 6 (630, 650) and not include information for a second transport block. This enables definition of a new DCI with similar field sizes as the currently used DCIs. The dynamic switching between both states could be indicated by a new additional bit in the DCI format. However, the new DCI may also have a different format. For instance, the interference information may be added to the DCI. Accordingly, the DCI may include the scheduling information relating to both transport blocks and in addition thereto a new field for carrying the interference information (interference parameters). It is noted that such additional interference information field may have any size, in accordance with the interference parameters to be transmitted. The size may be fixed with a predefined number of bits. With the new DCI defined, the switching would not require dynamic switching, since scheduling information for two transport blocks and interference information can be provided within the same DCI format.

FIG. 8 illustrates an embodiment of the present invention, according to which the switching between the two states A and B is performed in a semi-static fashion by means of a higher-layer signalling, e.g., by means of MAC or RRC messages. For the switching message, a new element may be added into an already defined MAC or RRC message. For instance, RRC Connection Reconfiguration described in Section 5.3.5 of 1 of the LTE specification 3GPP TS 36.331 v12.1.0, March 2014. Alternatively, a new MAC or RRC message could be defined for indicating NAICS support by the serving eNB.

The decision on state change can be made for example based on reference signal received power (RSRP) or RSRQ measurements of neighboring cells. RSRP is a linear average of reference signal power over a specified bandwidth. It is usually measured by the UE for the purposes of cell selection, reselection and handover. The UE measures the power of the pilot signals (reference signals transmitted with a predefined power). The measurement result is reported to the serving node. The RSRQ measurement provides additional information and is the ratio between the RSRP and the Received Signal Strength Indicator (RSSI), and depending on the measurement bandwidth, means the number of resource blocks. RSSI is the total received wideband power including all interference and thermal noise. As RSRQ combines signal strength as well as interference level, this measurement value provides additional help for mobility decisions as well as a means for roughly estimating the interference level. RSRQ measurement results are also signaled to the serving node. Details to RSRP and RSRQ can be found in the LTE specification 3GPP TS 36.214 v11.1.0, December 2012, Section 5.1.1 and Section 5.1.3, respectively. Accordingly, the measurements provided by the receivers of the DCI information to the serving node (serving base station) may be used to make the decision on whether or not the DCI shall include interference parameters. According to the decision performed at the serving node, the serving node then transmits the switching message to the respective DCI receivers. It is noted that RSRP and RSRQ are only examples from the LTE. However, the present invention is not limited to these examples.

In general, any measurements reported to the serving node from the DCI receivers reflecting the interference conditions of the DCI receivers can be used.

Alternatively to signalling the DCI format including or not the interference information via higher layer signalling, dynamic switching by means of L1 signalling between the provision of scheduling information for two transport blocks (state A) without interference information and the provision of scheduling information for a single transport block plus interference information (state B) is envisaged according to another embodiment of the invention.

Accordingly, a switching indication on the physical layer is provided, wherein the switching indication indicates the format of the second field, namely whether or not the second field is to carry the interference information. The switching indication layer be signalled directly within the corresponding DCI.

In particular, the switching between the two states A and B (i.e., the format of the second field in the DCI format to be applied) is indicated within the DCI format itself. This can be achieved by either introducing a new bit that will be used for indicating the state, or by assigning for this purpose a bit within the existing DCI format(s).

Figure 9:
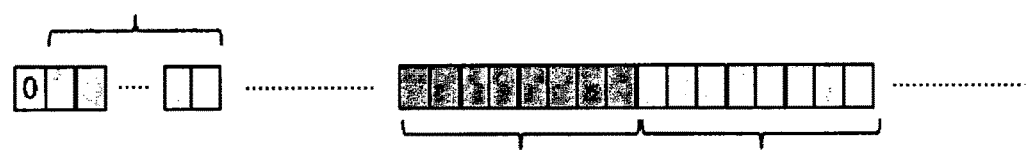
FIG. 9 is a schematic drawing illustrating switching between two formats of the DCI by means of the resource allocation header.
Figure 9:
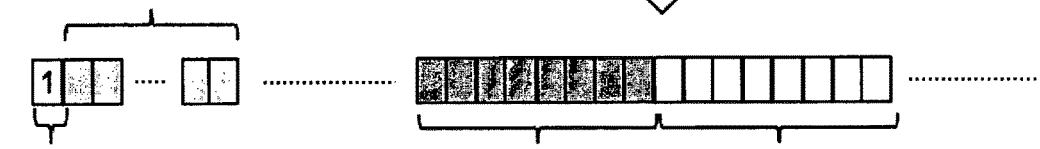

FIG. 9 shows the reuse of resource allocation header of DCI formats 2, 2A, 2B, 2C and 2D. The resource allocation header in these DCI formats is currently used in Release-11 LTE for the purpose of switching between two allocation types:

Type 0: A bitmap indicates resource block groups (RBGs) that are allocated to the scheduled UE. RBGs consist of respective sets of consecutive physical resource blocks (PRBs).

Type 1: Individual PRBs can be addressed within a subset of PRBs. The bitmap is slightly smaller than for Type 0 since some bits are used to indicate the subset of PRBs. The motivation for providing this method of resource allocation is flexibility in spreading the resources across the frequency domain to exploit frequency diversity.

As described above, resource allocations according to Type 1 are used in order to better exploit frequency diversity. This can be seen as a strategy for addressing inter-cell interference, as well. However, regarding the interference information required for effective interference cancellation or suppressions, this allocation scheme is rather counterproductive, since spreading the PDSCH over a large part of the frequency channel will most likely result in a minimum correlation between the interference parameters of different PRBs which cause interference to the considered PDSCH. It would require hence a rather large amount of interference parameter signalling overhead if blind detection of these parameters is not possible. In terms of interference parameter provision, resource allocation based on Type 0 is thus more beneficial due to the allocation granularity of groups of consecutive PRBs.

Accordingly, the restriction to resource allocation of Type 0 for a DCI format with single transport block allocations plus provision of interference information is not expected to constitute any negative impact on the PDSCH throughput performance.

Figure 10:
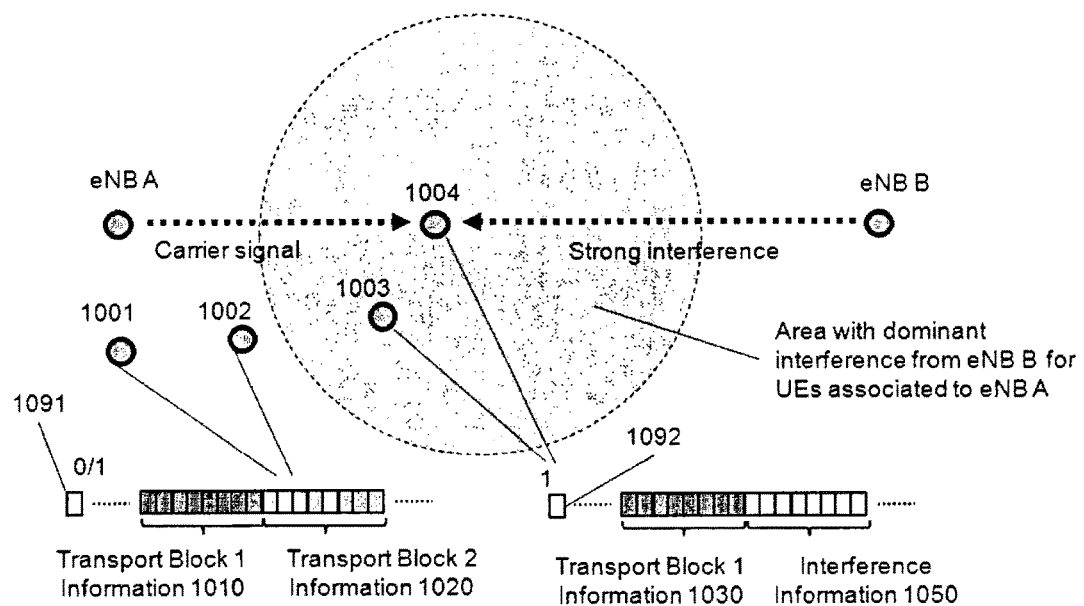
FIG. 10 is a schematic drawing illustrating transmission of interference parameter for terminals affected by strong interference.
Figure 11:
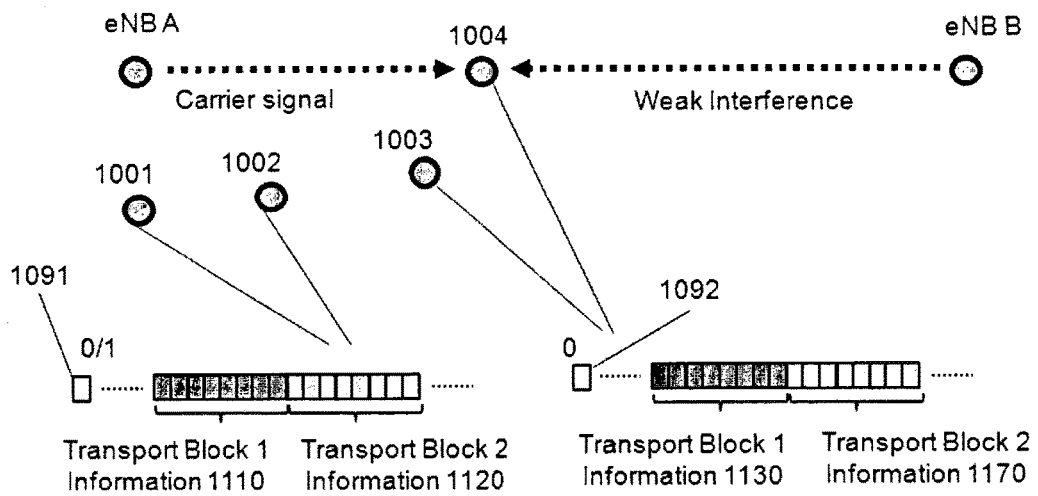
FIG. 11 is a schematic drawing illustrating transmission of interference parameter for terminals affected by strong interference.

The application of the dynamic indication of interference information provision is shown in FIGS. 10 and 11 for the case with high and low traffic load in the interfering eNB B, respectively. In particular, FIG. 10 shows terminals 1001 and 1002 which do not experience high interference. Terminals 1003 and 1004 are within the area with dominant interference from the eNB B. Thus, it is beneficial when terminals 1003 and 1004 are provided with interference parameters corresponding to the transmission configuration of the eNB B in order to be able to estimate the interference and apply interference cancellation. Thus, terminals 1001 and 1002 are provided with scheduling information concerning two transport blocks 1010 and 1020. The resource allocation header 1091 is applied as envisaged in current Release-11 LTE, namely to signal Type 0 or Type 1 as explained above. In contrast, since terminals 1003 and 1004 require transmission of interference information, they are provided with DCI including scheduling information for only one transport block 1030 and with interference parameters 1050. This interpretation of the first and second field is signalled by setting the resource allocation header 1092 to 1.

FIG. 11 shows a case in which the interference from the eNB B is not significant, so that terminals 1003 and 1004 also do not require the provision of interference information. Thus, the DCI for terminals 1003 and 1004 includes resource allocation header set to 0, meaning that the first field 1130 as well as the second field 1170 carry scheduling information related to the respective transport blocks. In the examples of both FIG. 10 and FIG. 11 it is assumed that terminals 1003 and 1004 apply Type 0 allocation. However, the allocation may be set freely to Type 0 or Type 1 for the terminals 1001 and 1002.

UE 1001 and UE 1002 are not configured for NAICS support since they are not expected to experience strong interference from eNB B (e.g., based on RSRP measurements as described above) even in case of high traffic load. These UEs can always be scheduled with two transport blocks resource and resource allocation based either on Type 0 or Type 1.

UE 1003 and UE 1004 are potential interference victims of eNB B in case of high traffic load in the corresponding cell. The fact that these UEs are potential interference victims can for example be determined by means of RSRP measurements as described above for the higher layer signalling example. UE 1003 and UE 1004 are therefore configured for NAICS support. According to one embodiment of the invention, this means that PDSCHs for these UEs can only be scheduled with resource allocation Type 0 and the DCI format provides either scheduling information for two transport blocks or scheduling information for a single transport block plus interference information.

For UE 1003 and UE 1004, two transport blocks can be scheduled if the SINR level is high due to low traffic load at eNB B, assuming it is the dominant cause for interference. The serving eNB A can be informed about the traffic load at eNB B via backhaul signalling between both eNBs, for example by a corresponding extension of the X2 interface defined in the LTE specification 3GPP TS 36.423 v12.1.0, March 2014. If the traffic load is high, the UE could be scheduled for single transport block transmissions in combination for the provision of interference information.

The dynamic switching between the two possibilities for UE 1003 and UE 1004 is beneficial in case of fast fluctuations of the traffic load which is for example prevailing in case of FTP traffic assumptions. The downlink control signalling for a UE configured for NAICS support can therefore be described by three states: state A with no provision of interference information and possible scheduling of two transport blocks with resource allocation based on Type 0 and Type 1; state B1 with scheduling of two transport blocks with resource allocation based on Type 0 without interference information; and state B2 with scheduling of a single transport block with resource allocation based on Type 0 and with interference information.

Figure 12:
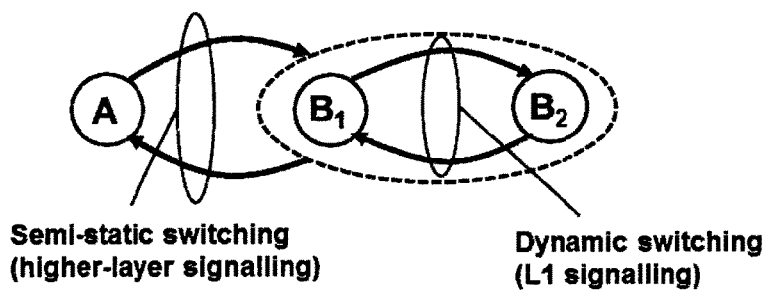
FIG. 12 is a schematic drawing illustrating state transitions for signaling the interference parameters as shown in FIGS. 9 and 10.

The corresponding state model is illustrated in FIG. 12. The switching between state A and state B (with sub-states B1 and B2) is performed in a semi-static fashion by means of higher-layer signalling. For instance, by means of RRC Connection Reconfiguration described in Section 5.3.5 of 1 of the LTE specification 3GPP TS 36.331 v12.1.0, March 2014. The switching between sub-states B1 and B2 is performed in a dynamic fashion by means of an indication within the DCI format as described in this invention.

In summary, the switching indication is received in this embodiment within a 3GPP LTE Release-11 downlink control information message, in the resource allocation header field, while it is assumed that Type 0 allocation applies. Moreover, the resource allocation header interpretation is configured semi-statically by a layer higher than the physical layer, wherein the resource header is interpretable either as indicating Type 0 or Type 1 allocation or as indicating the switching indication. The higher layer signalling may be MAC or RRC.

Figure 13:
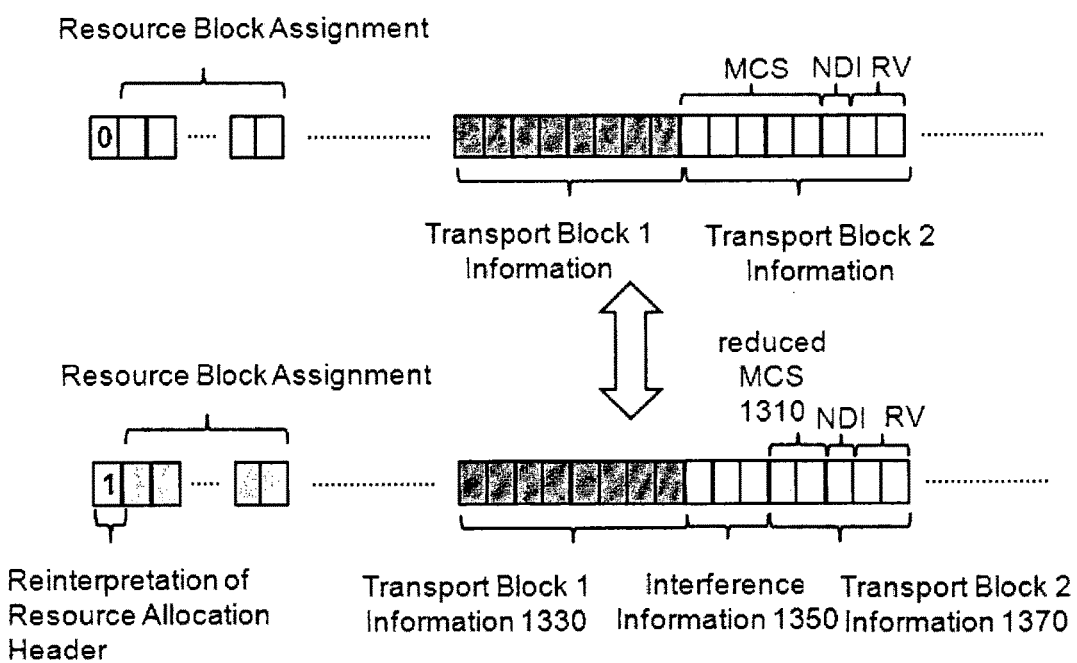
FIG. 13 is a schematic drawing illustrating transmission of interference information within a portion of the MCS field of the scheduling information for the second transport block.

FIG. 13 illustrates another alternative to the approach illustrated in FIGS. 11 and 12. In particular, FIG. 13 shows a variant for the dynamic switching between providing interference information or not, by means of reinterpretation of the resource allocation header bit in the DCI format 2, 2A, 2B, 2C or 2D of Release-11 LTE. The scheduling of two transport blocks in this alternative is possible even in combination with the provision of interference information. As can be seen in FIG. 13, the dynamic switching may be applied also in this embodiment. However, it is noted that the format of the second field 1350, 1370 as shown in FIG. 13 may also be applied without dynamic switching. The switching may be semi-static by higher layer protocols.

In FIG. 13 the scheduling information extracted from the first field of the downlink control information is a first scheduling information 1330 which indicates transmission parameters for a first transport block of data. The second field of the downlink control information includes either the interference information 1350 together with a reduced second scheduling information 1370 which indicates transmission parameters for a second transport block of data or only a complete second scheduling information which indicates transmission parameters for a second transport block of data.

Advantageously, the first and the second field have the same sizes, each of the first and the second field includes a modulation and coding scheme subfield for indicating modulation and coding scheme (MCS), and the modulation and coding scheme subfield of the first field is larger than the modulation and coding scheme subfield of the second field. Thus, the MCS field is reduced in order to enable within the same DCI to signal both, the interference parameters and the information concerning second transport block. It is noted that shortening the MCS is only an example. In general, any information such as RV may be shortened alternatively or in addition to the MCS field.

However, in this embodiment the scheduling flexibility of Transport Block 2 is reduced; the original allocation of five bits for indicating the modulation and coding scheme (MCS) is reduced fraction of these five bits (e.g., two bits in the example shown in 13). This reduced number of bits for the MCS indication could for example be used for indicating the MCS level by means of differential indication compared to the MCS level of Transport Block 1 assuming the same MCS table for Transport Block 1 and Transport Block 2 as defined in Section 7.1.7 of the LTE specification 3GPP TS 36.213 v12.0.0, December 2013. Two bits for the differential MCS indication would support four levels and three bits would support eight levels. More bits for the differential would provide even more flexibility, but the benefits are expected to be negligible.

The drawback of this approach compared the scheme described with reference to FIGS. 10 to 12 is that the number of bits that can be used for the provision of interference information is reduced.

To which extent this affects the system performance depends on the amount of required interference information in the UE receiver; the more interference information is required, the more bits are required in the corresponding DCI as well and the more serious is the reduction of the MCS range.

Figure 14:
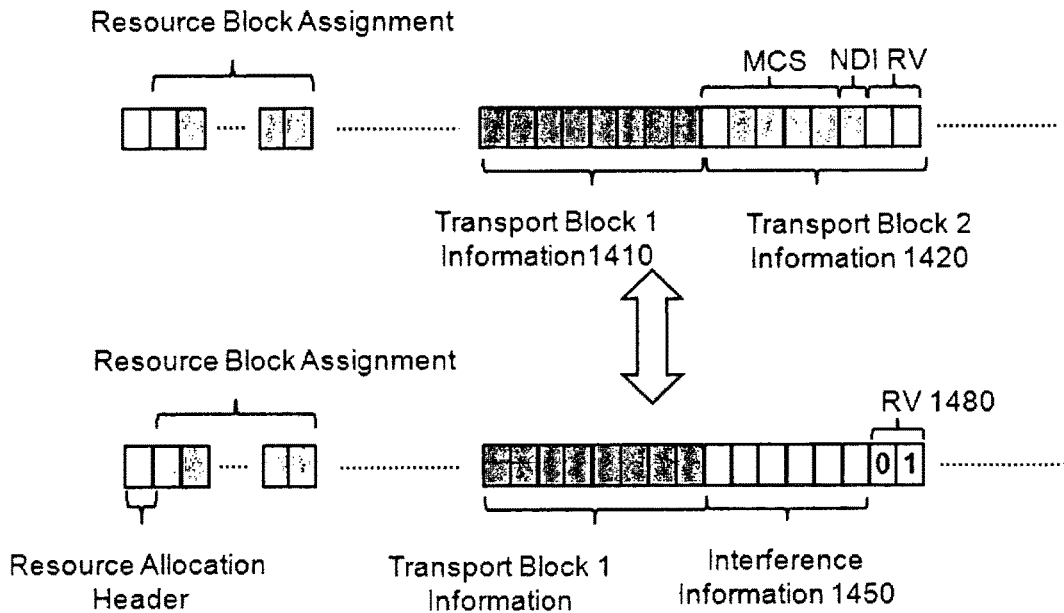
FIG. 14 is a schematic drawing illustrating switching between two formats of the DCI by means of the redundancy version field.

FIG. 14 shows another variant for the dynamic provision of interference information within DCI format 2, 2A, 2B, 2C and 2D. In contrast to the schemes described above with reference to FIGS. 10 to 13, the switching between DCI format interpretations is not indicated by the reinterpretation of the resource allocation header bit, but by a certain code point of the redundancy version (RV) field for Transport Block 2. FIG. 14 shows on the top the transmission of the DCI with the scheduling information 1410 for the first transport block and the scheduling information 1420 for the second transport block. The last two bits of the scheduling information 1420 are formed by redundancy version which thus may take values 00, 01, 10, and 11. Since the RV in the field 1420 has a value different from a predefined value (here the codepoint 01), the field 1420 is interpreted as the scheduling information for the second transport block. On the bottom of FIG. 14, the redundancy version 1480 of the second field 1450 has the value of 01, which corresponds to the predefined value and indicates in this embodiment that the second field 1450 is to be interpreted as interference information and not as the scheduling information for the second transport block.

In other words, in this embodiment, the switching indication is signalled within the second field in that at least one codepoint among all possible values defined by a subset of bits of the second field indicates that the interference information is transmitted in the second field and all codepoints other than said at least one codepoint indicate that the interference information is not transmitted in the second field. As shown in FIG. 14, the subset 1480 of bits can take either the value of said at least one codepoint (e.g., 10 in 1450) or another value indicating redundancy version for the second transport block (e.g., RV in 1420). However, it is noted that usage of the redundancy version is only an example. In general, a codepoint of another subset of bits of the second field 1450 may be taken for signaling the presence of the interference information. For instance, one or more codepoints may be reserved for this purpose in the modulation and coding scheme field MCS. This may be also the case in the embodiment described with reference to FIG. 13, for the reduced MCS field. In such a case, the resource block header in FIG. 13 would not need to be reinterpreted and could be used in its usual meaning at any interference conditions. Further combinations of these two embodiments are possible as is clear to those skilled in the art.

The RV field is used in LTE Release-11 for selecting different redundancy versions of a code word for HARQ transmissions; four different redundancy versions are supported and may be employed as in the present embodiment. In order to allow dynamic switching between the allocation of two transport blocks without interference information and a single transport block with interference information within the DCI, a certain RV field code point (e.g., 01 in FIG. 14, but generally any of the points 00, 11, 01, 11) of Transport Block 2 could be used for indicating the provision of interference information instead of scheduling information for Transport Block 2.

The advantage of this approach is that resource allocation can be performed based on both Type 0 and Type 1. The implied restriction is that a certain redundancy version cannot be scheduled for Transport Block 2. Compared to the solution described with reference to FIGS. 10 to 12, the number of bits that can be used for providing interference information is furthermore reduced from eight bits to five bits.

Figure 15:
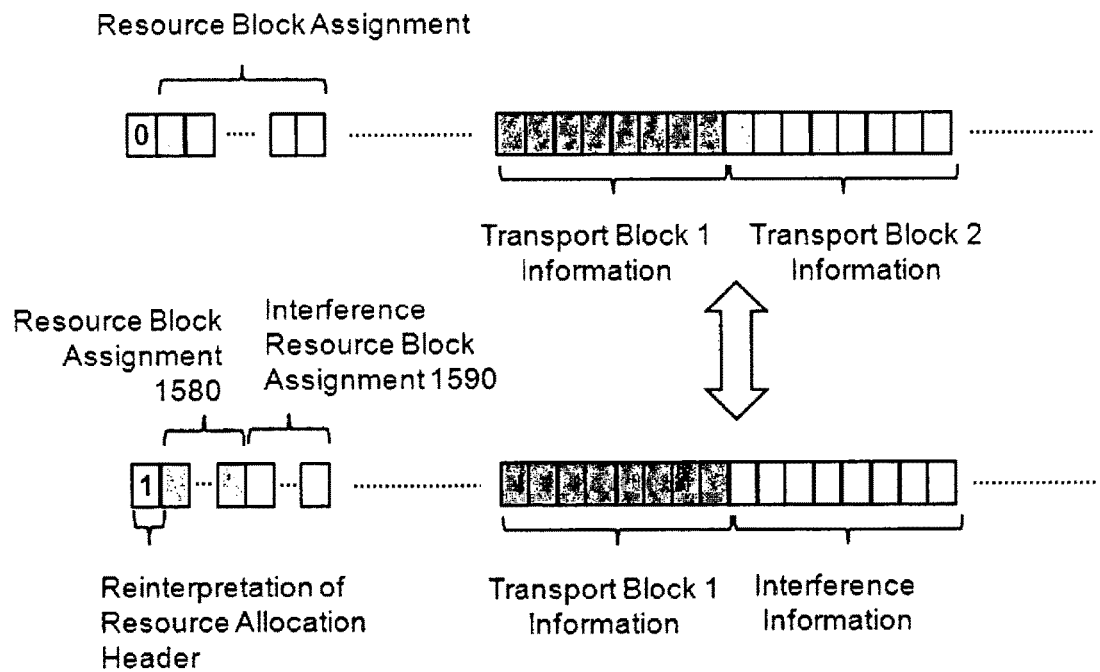
FIG. 15 is a schematic drawing illustrating utilization of unused resource block assignment bits in case of lower granularity of resource block assignment.

Another variant of the present invention is shown in FIG. 15. Accordingly, parts of the resource block allocation (RBA) field of the DCI are reused for indicating the interference resource allocation that adheres to the interference parameter information provided in the bit field for Transport Block 2. It is noted that the term "switching indication" does not necessarily mean that the indication indicates change of the format. As shown in the above examples, the switching indication may indicate the format applicable (switched) for the current DCI. However, the present invention is not limited thereto and the switching indication may also indicate whether the format is to be changed or not. The same applies for the switching message transmitted by higher layers and described above.

In LTE Release-11, assuming that the resource allocation is based on Type 0, the RBA field of the DCI represents a bitmap that indicates the set of resource block groups (RBGs) which are allocated for the PDSCH transmission indicated in the DCI. An RBG constitutes a set of consecutive physical resource blocks (PRBs), and the RBG size, which may be 1, 2, 3 or 4 PRBs, depends on the downlink bandwidth as shown in the following Table 1:

TABLE 1

RBG size for Type 0 resource allocation

| Downlink bandwidth (number of PRBs) | RBG size (number of PRBs) | Resource allocation granularity for NAICS (number of PRBs) |
|---|---|---|
| 6-10 | 1 | 2 |
| 11-26 | 2 | 4 |
| 27-63 | 3 | 6 |
| 64-110 | 4 | 8 |

Table 1 shows furthermore how the resource allocation granularity would be reduced for resource allocations to a UE that is configured for NAICS support. The reduced allocation granularity entails the possibility to use a bitmap with half the size of the original RBA field in the current DCI for allocating PRBs for PDSCH transmissions. The other half of the RBA field is used for indicating the resource block allocation of the interference transmission that adheres to the provided interference parameter information by means of an interference resource allocation bitmap.

In particular, FIG. 15 shows reinterpretation of resource allocation header as described above for distinguishing whether or not the interference information is transmitted with the current DCI. However, this embodiment may also be applied without dynamic indication by means of higher layer configuration so that the resource allocation header maintains its usual meaning. Moreover, the present embodiment may also be combined with the previous embodiments described with respect to FIGS. 13 and 14. Thus, the switching indication may be transmitted within the second field and/or the second field may include both the interference information as well as the scheduling information. According to FIG. 15, the resource allocation header with length of one bit is followed by resource block assignment (RBA) field. The top part of FIG. 15 shows RBA field as currently used in LTE. The bottom part of FIG. 15 illustrates an example in which the RBA field includes a first subfield 1580 for carrying the allocation block assignment for the transmission defined further in the first field ("Transport Block 1 Information" in the figure) and a second subfield 1590 for carrying Interference Resource Block Assignment, i.e., a bitmap in which for each resource group pair (cf. table 1 above with the granularity resulting in resource group pairs of 2, 4, 6 or 8 PRBs) a corresponding bit indicates whether the interference information transmitted in the second field is to be applied or not. For example, a first bit of the Interference Resource Block Assignment 1590 may refer to the same resources to which the first bit of the bitmap concerning the resource block assignment 1580 is related. The first bit of 1590 may take value 0 which can indicate that the interference information is not to be applied for interference cancellation on the resources addressed by the corresponding first bit of the resource block assignment 1580. It can also take value 1 which indicates that the interference information is to be used for the respective resources.

In general, the resource block assignment field includes a first subfield 1580 indicating resource assignment for the transmission, for which the scheduling information is transmitted, and a second subfield 1590 indicating whether or not the interference information in the second field is to be applied for interference cancellation for the respective resources specified in the first subfield 1580. Accordingly, an interference cancellation unit in the transceiver of the DCI receiving apparatus may be controlled by the interference resource block assignment 1590 (i.e., by the second subfield) to apply or not interference cancellation for the respective resources addressed by the bits of the first subfield.

Another option is that the interference resource allocation bitmap is used for distinguishing two different sets of interference parameters in the interfering cell per resource allocation unit; the latter is determined based on the resource allocation granularity for NAICS given in Table 1.

Figure 16:
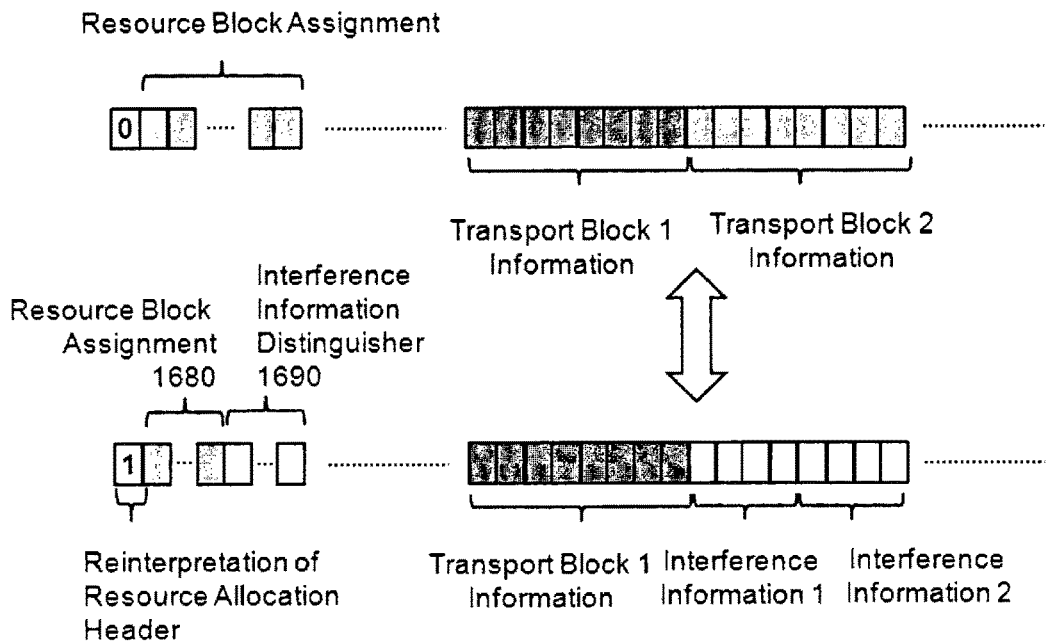
FIG. 16 is a schematic drawing illustrating utilization of unused resource block assignment bits in case of lower granularity of resource block assignment for controlling transmission of plural sets of interference information.

The bit field for Transport Block 2 could then be separated into two parts; one for indicating interference parameters of the first set, and a second one for indicating interference parameters of the second set. The concept is depicted in FIG. 16. In particular, the top part of FIG. 16 corresponds to the top part of FIG. 15. The bottom part shows the resource block assignment field which includes two subfields 1680, 1690. A first subfield 1680 corresponds to the subfield 1580 described with reference to FIG. 15, it indicates the resource block assignment. In particular, the first subfield 1580 carries a bitmap with each bit indicating whether a respective resource portion is assigned or not. The size of the portion addressed by one bit is given by the RBG size and the granularity applied in the NAICS mode. In the case of Table 1, row 2 for instance, each bit would refer to two RBGs, each of which consisting of two PRBs.

The second subfield 1690 of the resource block assignment field is an Interference Information Distinguisher and indicates for the respective assigned resources whether a first or a second interference information included in the second field is to be applied for the respective assigner resources. Moreover, the second field of the scheduling information carries two sets of interference information ("Interference Information 1" and "Interference Information 2"). Based on the Interference Information Distinguisher 1690 received within the DCI, the interference cancellation unit, part of a transceiver of the DCI receiving apparatus, applies either interference information 1 or interference information 2 for the purpose of interference estimation.

For instance, the first interference information may include a first set of interference parameters applicable to a CRS-based transmission (of the interferer) and the second information may include a second set of interference parameters applicable to DMRS-based transmission. The Cell-Specific Reference Signals (CRS) and Demodulation Reference Signals (DMRS) are reference signals used in LTE. In a CRS-based transmission, the CRS is merely a reference signal, so that no information on precoding is available based on CRS. Accordingly, the precoding information (such as precoding matrix and rank indicator) is to be transmitted separately. Since the precoding information related to the interferer (such as eNB B) also improves the estimation of interference, it makes sense when the first interference parameter set also includes the precoding information. DMRS is a reference signal which also carries information about the precoding and in particular the phase resulting from the applied precoding matrix of the data transmitted. Accordingly, for the DMRS-based transmission, no information concerning precoding is necessary. Accordingly, the second set of interference parameters advantageously does not include the precoding parameters.

However, it is noted that the example with DMRS-based transmission and CRS-based transmission by the interferer is only one of possible embodiments of the invention. The interference sets may also be structured in another way.

This structure of the RBA field in the above embodiments is provided while assuming that the resources are only assigned in couples when the interference information is transmitted in the DCI. Accordingly, only a half of the originally available range for RBA is necessary to indicate the allocation in such scenario. In particular, Table 1 shows that RBGs have 1, 2, 3 or 4 PRBs but the resources may be only assigned for twice as much PRBs, i.e., for 2, 4, 6 or 8 PRBs. This corresponds to granularity reduced by factor 2. In general, the granularity of the resource allocation may be even more restricted than the restriction of Table 1. For instance, the granularity may be reduced by factor 3. This would result in the values of last column in Table 1 of 3, 6, 9 and 12 PRBs.

Accordingly, the embodiment described with reference to FIG. 16 can be further extended by providing more sets of interference parameters in the respective more subfields of the second field. This would be enabled for higher granularities. Correspondingly the resource block assignment would include the first subfield for resource assignment and then a second subfield with 2 or more bits for indicating the set of interference parameters to be applied.

It is not expected that the reduced resource allocation granularity will have negative performance impacts. This assumption is motivated by the fact that the CQI reporting granularity for sub-bands that are configured by the eNB is already lower than the allocation granularity in case of aperiodic reporting, as shown in the following Table 2:

TABLE 2

| Sub-band size for aperiodic CQI reporting | |
|---|---|
| Downlink bandwidth (number of PRBs) | Sub-band size (number of PRBs) |
| 6-7 | (only Wideband CQI) |
| 8-26 | 4 |
| 27-63 | 6 |
| 64-110 | 8 |

Applying the above concept described with reference to FIGS. 15 and 16 would basically align the allocation granularity to the reporting granularity. A precondition for applying this variant of switching indicator signalling shown in FIGS. 15 and 16 is that the resource allocation in the interfering cell is based on Type 0 with reduced allocation granularity as well.

Instead of switching the state of the DCI format by reinterpreting the resource allocation header, variant C could also be combined with the state switching based on the RV field interpretation described above with reference to FIG. 14. It could furthermore be combined with the reduced MCS concept described with reference to FIG. 13.

The proposed signalling concept for the provision of interference information addresses all the above described design targets in an efficient manner.

Due to the reuse of bits that are common to DCI format 2, 2A, 2B, 2C and 2D, the provision of interference information can be provided in combination with a large variety of different transmission schemes. It allows therefore a significant degree of freedom of transmission schemes for UEs that makes use of NAICS support.

The reliability of DCI transmissions in terms of error rates is not affected by the provision of interference information since the DCI format size is not extended.

Additional blind decoding of PDCCHs is not required since interference information is provided together with PDSCH scheduling information within the same DCI format.

The interference information is provided by means of reusing bits within a DCI format that will most likely anyway not be used for scheduling PDSCHs for UEs that can benefit from interference cancellation or suppression.

In addition to semi-static configuration of NAICS support, the proposed signalling concept furthermore allows for fast switching between provision of interference information and possibility to schedule two transport blocks.

The interference parameters that could be provided to the UE within the DCI format could be a subset of the parameters described above. This could be for example be a simple indication whether PDSCH transmission are scheduled for reception based on DMSR or CRS in the interfering eNB; in case of the CRS based transmission, the corresponding PMI (precoding matrix indicator) and RI (rank indicator) could be indicated as well within the interference information since the precoding of the PDSCH is given by a code book entry given by PMI and RI, and the CRS as reference for the precoding. PDSCH receptions based on DMRS do not require the indication of a precoder (e.g., based on a code book) since the UE directly determines the precoder by measuring the DMRS. It could furthermore be reasonable to indicate the modulation order used on the interfering PBRs.

In addition to explicitly indicating certain interference transmission parameters such as PMI and RI it is also possible to indicate certain predefined sets of interference parameter combinations. The determination of the exact interference parameters would then be determined by means of blind detection on a reduced set of hypotheses. The benefit would be a reduced blind detection complexity.

It is furthermore possible to either provide interference information only from a single neighboring eNB (e.g., determined based on RSRP measurements on UE side), or from a set of neighboring eNBs.

The question which interference parameters can be determined by means of blind detection and which required support from network side in the form of indication by means of downlink control signalling is still under discussion at 3GPP RAN1 and RAN4. Details of the current discussion status can be found in the NAICS technical report and NAICS working item cited above.

A precondition for indication interference parameters to the interference victim UE without additional information on the PRB allocation of the interference together with the PDSCH allocation for that UE in the same DCI is the assumption that the interference allocation in terms of allocated PRBs coincides with the PRB allocation of the interfered PDSCH. This can be achieved by coordinated resource allocation between neighboring eNBs, for example by means of scheduling restrictions as they are currently discussed at 3GPP RAN1 within the scope of NAICS. More flexibility in the resource allocation of the interfering cell can be facilitated by utilizing the concept described with reference to FIGS. 15 and 16.

It is noted that the present invention is not limited to Release-11 LTE. It is applicable to any communication system in which the terminals served by a base station may suffer interference from other transmitters. Nevertheless, the present invention may readily be applied to the 3GPP LTE. Accordingly, in the following, some more details are provided for incorporating the present invention into the existing parts of the standard. In order to embody the present invention into the existing provisions of the standard, Transmission Modes defined in Release-11 may be used.

Figure 17:
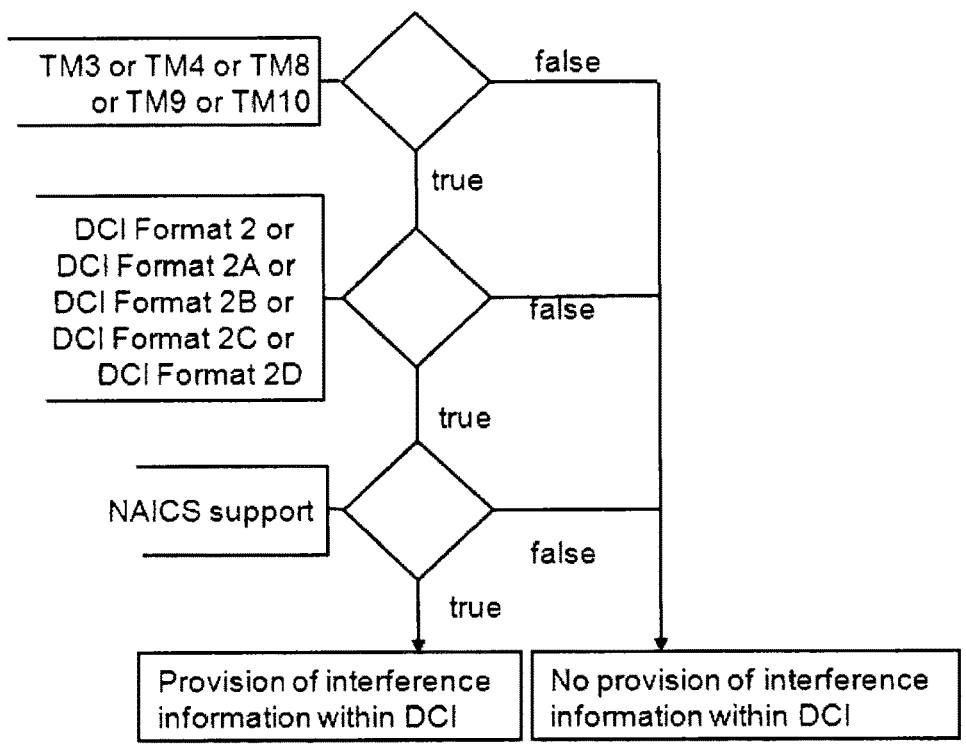
FIG. 17 is a schematic drawing illustrating relation between transmission modes and the transmission of interference information.

FIG. 17 shows a flow chart describing the PDSCH allocation in combination with providing interference information for Release-11 transmission modes that support scheduling of two transport blocks; which are TM3, TM4, TM8, TM9 and TM10 as described in 3GPP TS 36.213 v12.0.0, December 2013, Section 7.1. In LTE, a UE is configured for a single transmission mode per cell. Each of the transmission modes supports two transmission schemes that are distinguished by blind detection of the DCI format used for providing PDSCH scheduling information to the receiving UE. The DCI formats that are used for scheduling two transport blocks are DCI format 2, 2A, 2B, 2C and 2D corresponding to TM4, TM3, TM8, TM9 and TM10, respectively. The transmission mode is provided to the UE in an RRC message whenever the UE establishes an RRC connection which may be an initial connection to an LTE network or a reestablishment of an RRC connection.

The second supported DCI format of all considered transmission modes is DCI format 1A which is used for scheduling PDSCH transmissions by means of transmit diversity as described in 3GPP TS 36.213 v12.0.0, December 2013, Section 7.1. The provision of interference information (NAICS support) is only supported in the DCI format 2, 2A, 2B, 2C and 2D. Whether one of these DCI formats contains interference information is indicated to the receiving UE either by semi-static configuration based on higher-layer signalling or by dynamic indication within the DCI format itself. FIG. 17 thus illustrates the rules for generating/parsing the DCI. If the transmission mode is TM3, 4, 8, 9 or 10 (i.e., transmission mode supporting DCI formats for transmission of two transport blocks), then it is tested whether such DCI format is included. If the transmission mode is other than TM3, 4, 8, 9 or 10, inclusion of the interference information is not possible. If the DCI format is not a format 2, 2A, 2B, 2C or 2D, i.e., a format with a first and a second field related to transmission of two transport blocks, then the inclusion of the interference parameters is also not possible. However, if the DCI format is one of the 2, 2A, 2B, 2C or 2D formats, then it is to be tested whether NAICS support is enabled. If not, then the interference information cannot be included into the DCI. If the NAICS is supported, then any predefined of the possibilities of including the interference information into the DCI as described above may be applied.

Figure 18:
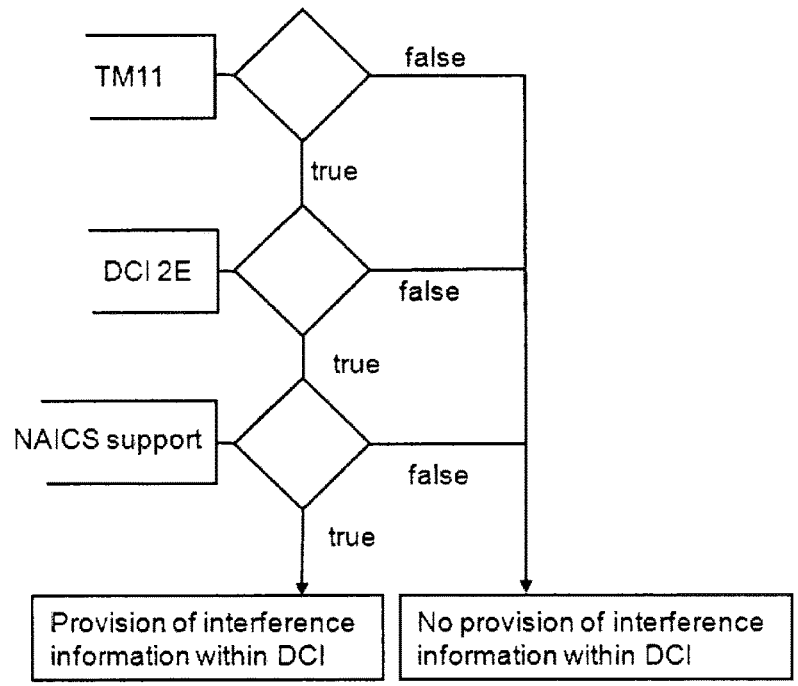
FIG. 18 is a schematic drawing illustrating relation between transmission modes including a new transmission mode and the transmission of interference information.

FIG. 18 shows an alternative flow chart considering the definition of a new transmission mode (i.e., TM11) for the provision of the interference information. Corresponding to the Rel-11 transmission modes TM3, TM4, TM8, TM9 and TM10, this new transmission mode could be used for scheduling two transport blocks without providing interference information or for scheduling a single transport block in combination with providing interference information as described in any of the above embodiments. The dynamic switching between both states could be indicated by a particular bit (e.g., NAICS flag) in the new DCI format (i.e., DCI format 2E).

In summary, all UEs are configured with a transmission mode to help it determine how to process data transmissions received on the Physical Downlink Shared Channel (PDSCH). According to an embodiment of the present invention a transmission mode (an interference transmission mode) is defined in accordance with which the terminal is configured to extract from the DCI the interference information. The extraction may be conditioned by a switching indication, i.e., once the UE is in the interference transmission mode, then the UE checks whether the switching indication indicates to extract or not to extract from the DCI the interference information and handles accordingly.

Another option corresponding to an embodiment of the invention is to introduce a new bit field for interference information within the new DCI format (i.e., DCI format 2E). Such a DCI format could then always allow the allocation of two transport blocks in combination with provision of interference information. Examples of new DCI formats in accordance with an embodiment of the invention are illustrated in FIGS. 20A and 20B.

Figure 20A:
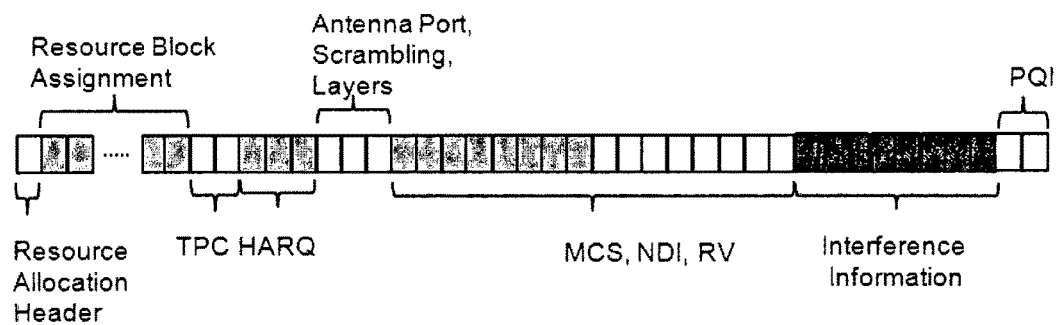
FIGS. 20A and 20B are schematic drawings illustrating new DCI formats supporting transmission of interference information.

FIG. 20A shows a DCI format 2E based on the format 2D described above with reference to FIG. 3E. Format 2E differs from the format 2D in particular by additionally including an interference information field. Thus, the exemplary format 2E is longer than the format 2D. Format 2E can be used always when the interference transmission is to be transmitted (conveyed). Accordingly, the application of the format 2E already indicates that the interference information is transmitted. For transmission of control information without interference information, another format such as 2D would be used.

Figure 20B:
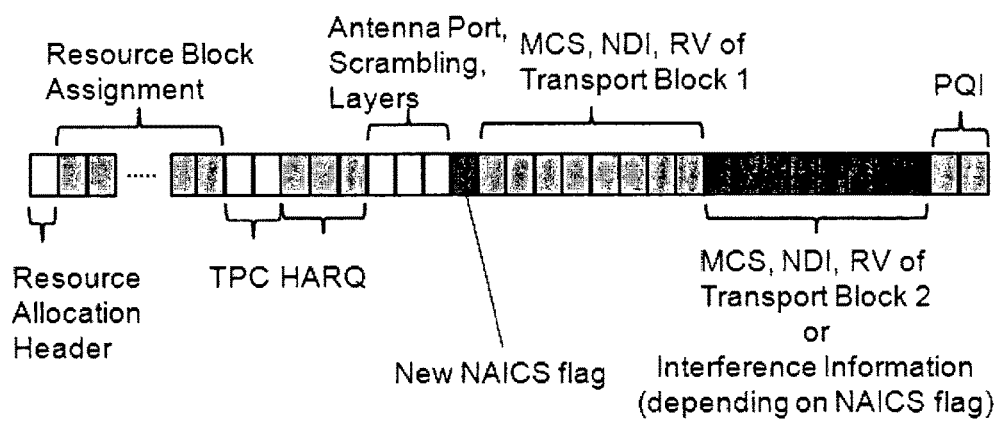

FIG. 20B shows another possible new DCI format 2F which may be defined alternatively or in addition to the format 2E described above. Format 2F is also based on format 2D described above with reference to FIG. 3E. However, in addition thereto, it includes a new NAICS flag which indicates whether the second field ("MCS, NDI, RV of Transport Block 2 or Interference Information") carries the interference information or the scheduling information for the second transport block. This flag thus indicates whether the network assisted interference cancellation and suppression is applicable at the receiver of the DCI.

It is noted that both above exemplified new DCI formats 2E and 2F are based on the existing format 2D. However, the present invention is not limited thereto; any of the formats 2, 2A, 2B, 2C or 2D described with reference to FIG. 3 may be adapted in a similar way. The advantage of a new DCI is that the resource allocation header may be used for its original purpose of signalling type 0 or type 1 resource allocation, irrespectively of interference situation and that also the other fields of the DCI may serve their usual purposes (such as redundancy version or MCS). However, the new DCI formats are slightly longer (format 2E includes the interference information in addition to the scheduling information of the two transport blocks, format 2F includes at least one more bit for the NAICS flag). It is noted that the length of the interference information in the new DCI formats, especially the format 2E does not have to match the length of the scheduling information. Any length necessary for signalling of the interference parameters or their subset as described above may apply.

The definition of a new transmission mode (such as TM11) for providing interference information to the receiving UE has the advantage that it is possible to define a new DCI format that can be optimized for the provision of interference information in terms of required number of bits and supported degrees of freedom for the PDSCH allocation in the serving cell; in contrast to the approaches described with reference to FIGS. 13 to 16, the new DCI format could for example always allow the allocation of two transport blocks with both Type 0 and Type 1 resource allocation plus indicating interference information.

The disadvantage of such an approach is that the size of the DCI format is increased, which results in reduced robustness and increased demand for control channel resources. Another issue is that the NAICS support in terms of providing interference information to the UE that is scheduled for a PDSCH is only supported for a single transmission mode (such as the TM 11) in contrast to the approaches without limiting the possibility of transmitting the interference information to a separate new transmission mode, where multiple transmission modes are supported.

In general, the provision of interference information together with PDSCH scheduling information within a single DCI format does not have to be restricted to a single new transmission mode and corresponding DCI format. Multiple transmission modes and corresponding DCI formats could be defined for NAICS support in order to feature more scheduling flexibility for the serving eNB.

Figure 19:
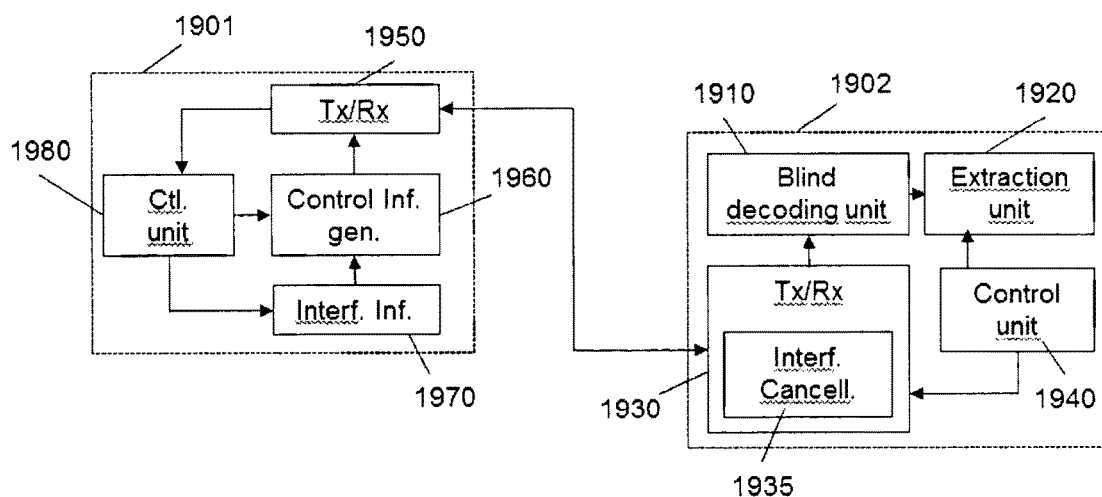
FIG. 19 is a block diagram illustrating some apparatuses according to the present invention.

FIG. 19 is a block diagram illustrating a control information receiver 1902 and a control information transmitter 1901 for embodying the above described functionality. In particular, the apparatus 1902 for receiving control data from a serving base station in a cellular communication system comprises a blind decoding unit 1910 for identifying and decoding a downlink control information (DCI) transmitted by the serving base station 1901; an extraction unit 1920 for extracting from a first field of the downlink control information decoded a scheduling control information and from a second field of the downlink control information an interference information; and a transceiver 1930 for receiving or transmitting data on resources specified by the scheduling information while taking into account the interference information so as to reduce (in the interference cancellation unit 1935) the interference caused by transmitters other than the serving base station. Moreover, a control unit 1940 may serve for controlling the extraction unit to extract from the second field the interference information or scheduling information for the second transport block. The apparatus 1902 may be a terminal such as a mobile terminal or any other device connected to the network via serving base station 1901 over wireless.

The apparatus 1901 for transmitting control data to a receiving device 1902 in a cellular communication system may be a serving base station (eNB A) for the receiving device 1902 and comprises: an interference information determining unit 1970 for determining the interference experienced by the receiving device 1902 caused by transmitters other than the serving base station (eNB B); a control information generation unit 1960 for generating a downlink control information including a first field including a scheduling control information and a second field including the interference information; and a transceiver (1950) for transmitting to the receiving device for blind decoding the generated downlink control information, and for receiving or transmitting data from/to the receiving device on resources specified by the scheduling information. The apparatus may further include control unit 1980 which may perform judgement on whether to generate and include or not the interference information into the downlink control information. This judgement may be based on the measurements received by the base station 1901 from the terminal 1902 and/or based on the load of the interfering base station if the interference is caused by another base station. The load information may be conveyed to the serving base station by means of a backhaul link between the serving and the interfering base station.

The explanations given in the Technical Background section above are intended to better understand the specific exemplary embodiments described herein and should not be understood as limiting the invention to the described specific implementations of processes and functions in the mobile communication network such as a network compliant with the 3GPP standards. Nevertheless, the improvements proposed herein may be readily applied in the architectures/systems described in the Technological Background section and may in some embodiments of the invention also make use of standard and improved procedures of these architectures/systems. It would be appreciated by a person skilled in the art that numerous variations and/or modifications may be made to the present invention as shown in the specific embodiments without departing from the spirit or scope of the invention as broadly described.

Another embodiment of the invention relates to the implementation of the above described various embodiments using hardware and software. It is recognized that the various embodiments of the invention may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

The present invention relates to transmission and reception of downlink control information in a communication system. In particular, a serving base station transmits to a terminal a downlink control information which includes a first field with a scheduling information and a second field with interference parameters (interference information). The receiver employs the interference parameters for interference estimation used in interference cancellation or suppression.

The invention claimed is:

1. An apparatus for receiving data from a serving base station in a cellular communication system, the apparatus comprising:
   a blind decoder which, in operation, identifies and decodes downlink control information transmitted by the serving base station,
   an extractor which, in operation, extracts from a first field of the downlink control information scheduling control information and from a second field of the downlink control information interference information, and
   a transceiver for receiving or transmitting data on resources specified by the scheduling control information while taking into account the interference information so as to reduce the interference caused by transmitters other than the serving base station, wherein the downlink control information includes a resource block assignment field that takes the format of: the resource block assignment field includes a first subfield indicating resource assignment for the transmission, for which the scheduling control information is transmitted, and a second subfield indicating whether or not the interference information in the second field is to be applied for interference cancellation for the respective resources specified in the first subfield.

2. The apparatus according to claim 1, wherein the scheduling control information extracted from the first field of the downlink control information is a first scheduling control information which indicates transmission parameters for a first transport block of data, the apparatus further comprising
   a controller which, in operation, controls the extraction unit to either extract from the second field of the downlink control information the interference information or a second scheduling control information which indicates transmission parameters for a second transport block of data.

3. The apparatus according to claim 1, wherein the scheduling control information extracted from the first field of the downlink control information is a first scheduling control information which indicates transmission parameters for a first transport block of data, the apparatus further comprising
   a controller which, in operation, controls the extraction unit to extract from the second field of the downlink control information either the interference information and a reduced second scheduling control information which indicates transmission parameters for a second transport block of data or only a complete second scheduling control information which indicates transmission parameters for a second transport block of data.

4. The apparatus according to claim 3, wherein
   the first and the second field have a same size,
   each of the first and the second field includes a modulation and coding scheme subfield for indicating modulation and coding scheme (MCS),
   the modulation and coding scheme subfield of the first field is larger than the modulation and coding scheme subfield of the second field.

5. The apparatus according to claim 2, wherein
   the controller is configured to receive a switching message on a protocol layer higher than the physical layer, and
   the switching message indicates a format of the second field, wherein the format dictates whether or not the second field is to carry the interference information.

6. The apparatus according to claim 2, wherein
   the controller is configured to receive a switching indication on the physical layer, and
   the switching indication indicates a format of the second field, wherein the format dictates whether or not the second field is to carry the interference information.

7. The apparatus according to claim 6, wherein
   the controller is configured to receive the switching indication within a 3GPP LTE Release-11 downlink control information message, in a resource allocation header field, where it is assumed that Type 0 allocation applies.

8. The apparatus according to claim 7, wherein an interpretation of the resource allocation header field is configured semi-statically by a layer higher than the physical layer, wherein the resource allocation header field is interpretable either as indicating Type 0 or Type 1 allocation or as indicating the switching indication.

9. The apparatus according to claim 6, wherein
the controller is configured to receive the switching indication within the second field, wherein at least one codepoint among all possible values defined by a subset of bits of the second field indicates that the interference information is transmitted in the second field, and all codepoints other than said at least one codepoint indicate that the interference information is not transmitted in the second field.

10. The apparatus according to claim 9, wherein the subset of bits takes either the value of said at least one codepoint or another value indicating redundancy version for the second transport block.

11. The apparatus according to claim 1, wherein the second subfield of the resource block assignment field indicates for the respective resources assigned in accordance with the first subfield whether a first interference information or a second interference information is to be applied to said respective assigned resources, and
the second field includes a first subfield indicating the first set of interference parameters and a second subfield indicating the second set of interference parameters.

12. The apparatus according to claim 11, wherein the transceiver is configured to receive within a protocol of a layer higher than the physical layer control information carrying a transmission mode, wherein the transmission mode can take a value which defines that the apparatus is to extract from the downlink control information the interference information as well as values which do not define that the apparatus is to extract the interference information from the downlink control information.

13. An apparatus for transmitting data to a receiving device in a cellular communication system, the apparatus being a serving base station for the receiving device, comprising:
an interference information determiner which, in operation, determines interference experienced by the receiving device caused by transmitters other than the serving base station,
a control information generator which, in operation, generates downlink control information including a first field including scheduling control information and a second field including interference information, and
a transmitter which, in operation, transmits to the receiving device for blind decoding the generated downlink control information, and receives or transmits data from/to the receiving device on resources specified by the scheduling control information, wherein the downlink control information includes a resource block assignment field that takes the format of: the resource block assignment field includes a first subfield indicating resource assignment for the transmission, for which the scheduling control information is transmitted, and a second subfield indicating whether or not the interference information in the second field is to be applied for interference cancellation for the respective resources specified in the first subfield.

14. The apparatus according to claim 13, further comprising a switching indication generator which, in operation, generates a switching indication indicating whether or not the interference information is included into the downlink control information, and embeds the switching indication either semi-statically within a protocol layer higher than a physical layer, or dynamically within the downlink control information.

15. The apparatus according to claim 13 further comprising an interference judgement unit which, in operation, decides whether or not to provide the interference information within the downlink control information based on measurements of a reference signal, reported to the apparatus by the receiving device and/or based on load information of an interfering base station.

16. A method for receiving data from a serving base station in a cellular communication system, the method comprising the steps of:
blind decoding for identifying and decoding downlink control information transmitted by the serving base station,
extracting from a first field of the downlink control information scheduling control information and from a second field of the downlink control information interference information, and
receiving or transmitting data on resources specified by the scheduling control information while taking into account the interference information so as to reduce interference caused by transmitters other than the serving base station, wherein the downlink control information includes a resource block assignment field that takes the format of: the resource block assignment field includes a first subfield indicating resource assignment for the transmission, for which the scheduling control information is transmitted, and a second subfield indicating whether or not the interference information in the second field is to be applied for interference cancellation for the respective resources specified in the first subfield.

17. A method for transmitting data to a receiving device in a cellular communication system, the apparatus being a serving base station for the receiving device, comprising:
determining interference experienced by the receiving device caused by transmitters other than the serving base station,
generating downlink control information including a first field including scheduling control information and a second field including interference information, and
transmitting to the receiving device for blind decoding the generated downlink control information, and receiving or transmitting data from/to the receiving device on resources specified by the scheduling control information, wherein the downlink control information includes a resource block assignment field that takes the format of: the resource block assignment field includes a first subfield indicating resource assignment for the transmission, for which the scheduling control information is transmitted, and a second subfield indicating whether or not the interference information in the second field is to be applied for interference cancellation for the respective resources specified in the first subfield.

* * * * *